(12) United States Patent
Tanimura et al.

(10) Patent No.: US 9,103,970 B2
(45) Date of Patent: Aug. 11, 2015

(54) OPTICAL LAYERED BODY, METHOD FOR PRODUCING OPTICAL LAYERED BODY, POLARIZER, AND IMAGE DISPLAY DEVICE

(71) Applicant: DAI NIPPON PRINTING CO., LTD., Tokyo (JP)

(72) Inventors: Toshiyuki Tanimura, Tokyo (JP); Keiko Tazaki, Tokyo (JP); Yu Morioka, Tokyo (JP); Koji Hashimoto, Tokyo (JP); Kenji Ueno, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 141 days.

(21) Appl. No.: 14/115,986

(22) PCT Filed: Jan. 11, 2013

(86) PCT No.: PCT/JP2013/050460
§ 371 (c)(1),
(2) Date: Nov. 6, 2013

(87) PCT Pub. No.: WO2013/105656
PCT Pub. Date: Jul. 18, 2013

(65) Prior Publication Data
US 2014/0071529 A1 Mar. 13, 2014

(30) Foreign Application Priority Data

Jan. 11, 2012 (JP) ................................ 2012-003634
Jan. 11, 2012 (JP) ................................ 2012-003635

(51) Int. Cl.
*G02B 1/11* (2015.01)
*B32B 27/00* (2006.01)
*G02B 1/04* (2006.01)
*G02B 5/30* (2006.01)

(52) U.S. Cl.
CPC . *G02B 1/11* (2013.01); *B32B 27/00* (2013.01); *G02B 1/04* (2013.01); *G02B 5/3033* (2013.01); *Y10T 428/24413* (2015.01); *Y10T 428/24942* (2015.01); *Y10T 428/31573* (2015.04); *Y10T 428/31591* (2015.04)

(58) Field of Classification Search
CPC .......... G02B 1/11; G02B 1/04; G02B 5/3033; B32B 27/00; Y10T 428/24413; Y10T 428/24942; Y10T 428/31591; Y10T 428/31573

USPC .......... 359/483.01, 485.03, 488.01, 601; 428/212, 424.2, 425.1, 148; 427/508; 349/96

See application file for complete search history.

(56) References Cited

U.S. PATENT DOCUMENTS

| | | | | |
|---|---|---|---|---|
| 4,470,701 | A | * | 9/1984 | Smith ............................ 356/467 |
| 6,086,794 | A | * | 7/2000 | Nobutoki et al. .............. 252/582 |
| 2005/0146787 | A1 | * | 7/2005 | Lukyanitsa .................... 359/462 |

FOREIGN PATENT DOCUMENTS

| | | |
|---|---|---|
| JP | 2000-258606 | 9/2000 |
| JP | 2003-075603 | 3/2003 |

(Continued)

OTHER PUBLICATIONS

Machine Translation of JP 2011-145649 from "https://www4.j-platpat.inpit.go.jp/cgi-bin/tran_web_cgi_ejje?u=http://www4.j-platpat.inpit.go.jp/eng/translation/201505160724383385428 378563 172973EE08C121142C3736980426D10E535556" on May 15, 2015.*

*Primary Examiner* — Frank Font
(74) *Attorney, Agent, or Firm* — Hamre, Schumann, Mueller & Larson, P.C.

(57) ABSTRACT

The present invention provides an optical layered body that has multiple laminated layers of which the refractive indexes are greatly different. The optical layered body can suitably prevent interfacial reflection and interference fringes attributed to the reflection in the interfaces between the layers. The optical layered body has a light-transmitting substrate, and at least an optical functional layer (1) on one surface of the substrate, wherein the refractive index of the optical functional layer (1) in the thickness direction continuously increases from the surface on the light-transmitting substrate side to the surface opposite to the light-transmitting substrate side to show a sigmoid curve.

13 Claims, 2 Drawing Sheets

Region (3)  Region (2)  Region (1)

(56) References Cited

FOREIGN PATENT DOCUMENTS

| | | |
|---|---|---|
| JP | 2005-238562 | 9/2005 |
| JP | 2008-250267 | 10/2008 |
| JP | 2009-086360 | 4/2009 |
| JP | 2009-208463 | 9/2009 |
| JP | 2011-145649 * | 7/2011 |
| WO | WO 2011074402 A1 * | 6/2011 |

* cited by examiner

Region (3)     Region (2)     Region (1)

OPTICAL LAYERED BODY, METHOD FOR PRODUCING OPTICAL LAYERED BODY, POLARIZER, AND IMAGE DISPLAY DEVICE

TECHNICAL FIELD

The present invention relates to an optical layered body, a method for producing an optical layered body, a polarizer, and an image display device.

BACKGROUND ART

Image display devices such as cathode ray tube (CRT) displays, liquid crystal displays (LCDs), plasma displays (PDPs), electroluminescence displays (ELDs), electronic paper, tablet PCs, and touch panels typically have, on their outermost surface, an optical layered body for anti-reflection. Those optical layered bodies for anti-reflection suppress reflection of an image or reduce the reflectance by diffusing or interfering light.

Those optical layered bodies for anti-reflection are formed through a dry process such as deposition or sputtering by, for example, a method of forming a thin film of a substance having a low refractive index (e.g. $MgF_2$) on a base film, or a method of forming alternating layers of a substance having a high refractive index [e.g. ITO (tin-doped indium oxide, $TiO_2$] and a substance having a low refractive index (e.g. $MgF_2$, $SiO_2$) on a base film.

Anti-reflection films produced through such a dry process, however, have a problem of a high production cost.

To solve the problem, a wet process, i.e., production of optical layered bodies for anti-reflection by coating, has recently been attempted.

For example, Patent Literature 1 describes an optical film that has a transparent substrate, a hard coat layer disposed on the substrate, and a low-refractive-index layer having a specific reflective index disposed on the hard coat layer.

In production of such an optical film, a typical method of providing functional layers on a substrate is the sequential multilayer coating in which coating and drying of a layer are repeated by, for example, roll coating (e.g. reverse roll coating, gravure roll coating), blade coating, wire bar coating, or die coating.

Also, Patent Literature 2, for example, discloses lamination of layers with different refractive indexes as a method for reducing reflection of light emitted from an external light source such as a fluorescent lamp and for eliminating interference fringes to increase the visibility of the display.

However, such a sequential lamination method repeats the application and drying process for multiple times, and thus leads to relatively many occasions for the layers to be exposed to the air, which sometimes causes deterioration of the functions or defects resulting from external foreign matters. Also, since the heat-drying process is repeated for multiple times, the productivity is unfortunately unfavorable in terms of the utilization efficiency of energy, and an increase in the number of layers results in an increase in the number of steps, complicating the production and increasing the production cost.

There is also a problem that the above low-refractive-index layers are thin films formed by application of compositions in the state of having a low solids content, which causes a low application rate to lead to a low productivity. Furthermore, the adhesion between the layers is low to give inferior durability.

A known method to solve these problems is producing an optical film by simultaneous lamination of at least two layers as described in, for example, Patent Literature 3, which includes laminating at least two functional layers at the same time, subjecting the layers to first ionizing radiation exposure, drying the layers, and subjecting the layers to second ionizing radiation exposure for curing.

The method in Patent Literature 3, however, is for clearly separating the functions of the at least two functional layers to be formed. An optical film produced thereby has, for example, a structure with layers of which the refractive indexes are greatly different. As a result, an interfacial reflection occurs to tint the optical film or cause interference fringes in the interface between the substrate and a layer formed on the substrate, thereby decreasing the visibility of images.

Also when an optical film is produced by simultaneously laminating at least two layers as described above, bubbles may occur in the lower functional layer(s) to whiten the layer(s), or to decrease the refractive index to give an undesired refractive index.

CITATION LIST

Patent Literature

Patent Literature 1: JP 2000-258606 A
Patent Literature 2: JP 2003-075603 A
Patent Literature 3: JP 2008-250267 A

SUMMARY OF INVENTION

Technical Problem

To improve such a current state of the art, the present invention aims to provide an optical layered body that has, on one surface of a light-transmitting substrate, an optical functional layer formed by laminating multiple coating films formed from materials of which the refractive indexes are greatly different. The optical layered body can suitably prevent interfacial reflection or interference fringes resulting from the interfacial reflection in the interfaces of the layers. The optical layered body can also suppress generation of whitening because of bubbles on the light-transmitting substrate side of the optical functional layer formed by laminating the multiple coating films, thereby controlling the refractive index at a high level. The present invention also aims to provide a method for producing the optical layered body, and a polarizer and an image display device produced using the optical layered body.

Solution to Problem

One aspect of the present invention is an optical layered body including at least an optical functional layer (1) on one surface of a light-transmitting substrate, wherein the refractive index of the optical functional layer (1) in the thickness direction continuously increases from the surface on the light-transmitting substrate side to the surface opposite to the light-transmitting substrate side to show a sigmoid curve.

In the optical layered body of the present invention, the optical functional layer (1) and an optical functional layer (2) having a refractive index higher than the optical functional layer (1) are preferably laminated in the stated order on one surface of the light-transmitting substrate.

In the optical layered body of the present invention, an inflection point of the sigmoid curve preferably indicates a change in the refractive index on the side opposite to the light-transmitting substrate side in the thickness direction of the optical functional layer (1).

Preferably, in the optical layered body of the present invention, the optical functional layer (1) contains refractive-index adjustment particles uneven distributed on the optical functional layer (2) side, and when, in a cross-section of the optical functional layer (1) in the thickness direction, a region within 2 μm from the interface on the light-transmitting substrate side is a region (1), a region within 2 μm from the interface on the side opposite to the light-transmitting substrate side is a region (3), and a region between the region (1) and the region (3) is a region (2), an area ratio of the refractive-index adjustment particles in the region (1) is 0 to 8%, an area ratio of the refractive-index adjustment particles in the region (2) is 9 to 400, and an area ratio of the refractive-index adjustment particles in the region (3) is 41 to 80%.

The refractive-index adjustment particles have a primary average particle size of 1 to 100 nm.

The optical layered body preferably further has a low-refractive-index layer on the optical functional layer (2).

Another aspect of the present invention is a method for producing an optical layered body including at least an optical functional layer (1) on one surface of a light-transmitting substrate, the method including the steps of: forming a laminated coating film by simultaneously applying a first optical functional layer (1) composition and a second optical functional layer (1) composition for forming the optical functional layer (1) to one surface of the light-transmitting substrate such that the first optical functional layer (1) composition is on the light-transmitting substrate side; pre-curing the laminated coating film using a light-emitting diode; drying the pre-cured laminated coating film; and forming the optical functional layer (1) by fully curing the dried laminated coating film, wherein the first optical functional layer (1) composition and the second optical functional layer (1) composition contain respective photopolymerization initiators having absorption in different wavelength regions.

The method for producing an optical layered body preferably further includes the step of forming an optical functional layer (2) having a refractive index higher than the optical functional layer (1) after the step of forming the optical functional layer (1).

Preferably, in the method for producing an optical layered body, the second optical functional layer (1) composition contains an ultraviolet-curable resin, refractive-index adjustment particles, a photopolymerization initiator with an absorption coefficient of more than 100 ml/g·cm at a wavelength of at least 360 nm, and a solvent, and the first optical functional layer (1) composition contains an ultraviolet-curable resin, a photopolymerization initiator with an absorption coefficient of 100 ml/g·cm at most at a wavelength of at least 360 nm, and the same solvent as the solvent in the first optical functional layer (1) composition.

Also, after the step of forming a laminated coating film, the step of pre-curing the laminated coating film is preferably performed before the refractive-index adjustment particles in the coating film of the second optical functional layer (1) composition are dispersed in the entire coating film of the first optical functional layer (1) composition.

In the step of pre-curing the laminated coating film, the laminated coating film is preferably irradiated with ultraviolet light to a cumulative amount of light of at least 400 mJ/cm$^2$ using the light-emitting diode.

Yet another aspect of the present invention is a polarizer including a polarizing element, and the above optical layered body on a surface of the polarizing element.

Yet another aspect of the present invention is an image display device including the above optical layered body or the above polarizer.

Hereinafter, the present invention is described in detail.

The present inventors have made intensive studies on an optical layered body that has on a light-transmitting substrate an optical functional layer formed by laminating two kinds of coating films formed from materials of which the refractive indexes are greatly different. As a result, the present inventors have found that, when the refractive index of the optical functional layer on the light-transmitting substrate side is controlled to increase continuously to make specific changes from the light-transmitting substrate side to the other surface side of the optical functional layer, the difference in the refractive index between the light-transmitting substrate and the light-transmitting substrate side of the optical functional layer can be practically eliminated. In that case, generation of the interfacial reflection and interference fringe resulting from the interfacial reflection in the interface between the light-transmitting substrate and the optical functional layer on the light-transmitting substrate side have been found to be properly prevented.

The present inventors have also made the following finding. That is, a conventional method for producing an optical layered body includes forming a laminated coating film by simultaneously applying compositions for forming two kinds of coating films formed from materials of which the refractive indexes are greatly different, to the light-transmitting substrate; pre-curing the laminated coating film; and fully curing the pre-cured laminated coating film. In this method, however, the two kinds of coating films are both pre-cured. Then, a residual solvent in the optical functional layer on the light-transmitting substrate side may cause fine bubbles, thereby whitening the optical functional layer or decreasing the refractive index of the optical functional layer to cause interfacial reflection in the interface between the optical functional layer and the light-transmitting substrate.

Based on the finding, the present inventors have further made studies. As a result, they have found that one of the two kinds of coating films is pre-cured and the other coating film is not pre-cured when the compositions for forming the two kinds of coating films formed from materials of which the refractive indexes are greatly different contain respective photopolymerization initiators having absorption in different wavelength regions, and the compositions simultaneously applied to the light-transmitting substrate are pre-cured, dried, and fully cured. Hence, the resulting optical functional layer can be suitably prevented from having bubbles on the light-transmitting substrate side because of a residual solvent, so that an optical layered body in which whitening does not occur can be produced. Thereby, the present invention has been completed.

The optical layered body of the present invention has at least the optical functional layer (1) on one surface of the light-transmitting substrate. In the optical layered body of the present invention, an optical functional layer (2) having a different refractive index from the optical functional layer (1) is preferably laminated on one surface of the optical functional layer (1) as described later.

The optical functional layer (1) herein preferably has a refractive index of 1.50 to 1.80, and the optical functional layer (2) herein has a refractive index of 1.80 to 2.80. The optical functional layer (2) preferably has a refractive index higher than the optical functional layer (1).

Here, the "refractive index" means an average refractive index. For example, and a refractive index (n) herein was obtained by determining the average refractive index (R) at wavelengths of 380 to 780 nm using a spectrophotometer (UV-3100PC, product of Shimadzu Corporation), and substituting the obtained average refractive index (R) into the following formula.

$$R(\%)=(1-n)^2/(1+n)^2$$

The light-transmitting substrate preferably has smoothness, heat resistance, and excellent mechanical strength.

Specific examples of a material for forming the light-transmitting substrate include thermoplastic resins such as polyesters (polyethylene terephthalate, polyethylene naphthalate), cellulose triacetate, cellulose diacetate, cellulose acetate butylate, polyamide, polyimide, polyether sulfone, polysulfone, polypropylene, polymethylpentene, polyvinyl chloride, polyvinyl acetal, polyether ketone, acrylic resins (polymethyl methacrylate), polycarbonate, and polyurethane. Preferred among these are acrylate resins and cellulose triacetate.

When the light-transmitting substrate is a cellulose triacetate (TAC) substrate made of TAC, impregnating the TAC substrate with the later-described ultraviolet-curable resin of the optical functional layer (1) enables prevention of interference fringes in the interface between the TAC substrate and the optical functional layer (1).

The light-transmitting substrate is preferably a highly flexible film of any of the above thermoplastic resins, but may be a plate of any of the thermoplastic resins if the intended use requires hardness, or may be a glass plate.

Other examples of the light-transmitting substrate include alicyclic amorphous olefin polymer (cyclo olefin polymer: COP) films. These are a base material produced using a compound such as a norbornene polymer, a monocyclic olefin polymer, a cyclic conjugated diene polymer, or a vinyl alicyclic hydrocarbon polymer. Examples thereof include ZEONEX and ZEONOR (norbornene resins) from Zeon Corporation; SUMILITE FS-1700 from Sumitomo Bakelite Co., Ltd.; ARTON (modified norbornene resin) from JSR; APEL (cyclo olefin copolymer) from Mitsui Chemicals, Inc.; Topas (cyclic olefin copolymer) from Ticona; and OPTOREZ OZ-1000 series (cyclic acrylic resins) from Hitachi Chemical Co., Ltd.

Also, a preferred alternative base material for triacetyl cellulose is FV series (low birefringence, low photoelastic film) from Asahi Kasei Chemicals Corporation.

The thickness of the light-transmitting substrate is preferably 5 to 300 μm. The lower limit of the thickness of the light-transmitting substrate is more preferably 30 μm, whereas the upper limit of the thickness of the light-transmitting substrate is more preferably 200 μm. If the light-transmitting substrate is a plate, the thickness may be out of these ranges. Before layers such as the optical functional layer (1) are formed on the light-transmitting substrate, the substrate may be subjected to a physical treatment such as corona discharge treatment or oxidation treatment, and may be coated with a coating material called an anchoring agent or primer, for improvement of adhesion. If a triacetyl cellulose film, an acrylic resin film, or a COP film which are often used as a light-transmitting substrate for LCDs is used as a material, the thickness of the light-transmitting substrate is preferably 20 to 65 to give a thin film for displays.

Here, in a conventional optical layered body having on a light-transmitting substrate a functional layer having a different refractive index from the light-transmitting substrate, if the light-transmitting substrate is the TAC substrate, generation of interference fringes is known to be suppressible in the interface between the TAC substrate and the functional layer by impregnating the substrate with the solvent or monomer components in the functional layer. However, such a method cannot be used if the light-transmitting substrate is an acrylic resin substrate or COP film, so that generation of interference fringes in the interface between the functional layer and the acrylic resin substrate or COP film cannot be fully suppressed. Here, if an acrylic resin substrate or COP film is used as the light-transmitting substrate, the acrylic resin substrate or COP film is subjected to a treatment such as a corona discharge treatment or formation of a primer layer for improvement of the adhesion to the functional layer. These treatments, however, cannot suppress generation of interference fringes. Hence, if an acrylic resin substrate or COP film is used as the light-transmitting substrate, a layer such as a hard coat layer having a similar refractive index to the acrylic resin substrate or COP film would be required between the functional layer and the acrylic resin substrate or COP film to suppress generation of interference fringes. Here, since the extra process of forming a hard coat layer is required as well as the corona discharge treatment or primer layer formation, the number of production steps and the number of interfaces for which the adhesion needs to be considered increase. Accordingly, there are great disadvantages, especially in terms of the production cost.

In contrast, in the optical layered body of the present invention, the refractive index of the optical functional layer (1) is controlled to show specific changes as described later. Also, since the optical functional layer (1) has hard coat properties as described later, generation of interference fringes can be sufficiently suppressed without a hard coat layer separately provided for adjusting the refractive index even when an acrylic resin substrate or COP film is used as the light-transmitting substrate. That is, the optical layered body of the present invention does not cause a problem of an increase in the number of production steps or in the number of interfaces for which the adhesion needs to be considered, and thus does not bring disadvantages in the production cost, even when an acrylic resin substrate or COP film is used as the light-transmitting substrate.

In the optical layered body of the present invention, the refractive index of the optical functional layer (1) in the thickness direction continuously increases from one side of the light-transmitting substrate to the other side of the light-transmitting substrate to show a sigmoid curve.

Here, the "sigmoid curve" means a curve as illustrated in FIG. 1, for example. That is, the refractive index of the optical functional layer (1) in the thickness direction is almost constant near the light-transmitting substrate, but becomes gradually higher at positions closer to the optical functional layer (2), and becomes very high on the optical functional layer (2) side.

The refractive index of the optical functional layer (2) in the thickness direction is higher than the refractive index of the optical functional layer (1) on the optical functional layer (2) side, and is almost constant. That is, the refractive index of optical functional layer (1) in the thickness direction changes continuously, while the refractive index in the region from the optical functional layer (1) to the optical functional layer (2) in the thickness direction changes discontinuously.

FIG. 1 is a graph schematically showing changes in the refractive index in the thickness direction of the optical functional layer (1) and the optical functional layer (2) of the optical layered body of the present invention.

In the optical layered body of the present invention, the refractive index of the optical functional layer (1) in the thickness direction continuously changes to show a sigmoid curve. In such an optical functional layer (1), the refractive index of the optical functional layer (1) near the interface on the light-transmitting substrate side is equivalent to the refractive index of the light-transmitting substrate. Thereby, the interfacial reflection in the interface between the light-transmitting substrate and the optical functional layer (1) can be prevented, and thus generation of interference fringes can be prevented. This is probably because the optical discontinuity in the interface between the light-transmitting substrate and the optical functional layer (1) is reduced, whereby the reflected light in the interface is also reduced. Meanwhile, the refractive index of the optical functional layer (1) near the interface on the optical functional layer (2) side discontinuously changes but the change is smaller than the refractive index of the optical functional layer (2). The optical layered body of the present invention, in the case of having the optical functional layer (2), therefore secures a sufficient difference in the refractive index between the optical functional layer (1) and the optical functional layer (2), attaining excellent anti-reflection properties.

Here, being "equivalent to the refractive index of the light-transmitting substrate" as stated above means that there is no difference between the refractive index of the optical functional layer (1) near the interface on the light-transmitting substrate side and the refractive index of the light-transmitting substrate, or there is a difference that causes interference fringes that are invisible. The difference that causes invisible interference fringes means that, specifically, the difference between the refractive index of the optical functional layer (1) near the interface on the light-transmitting substrate side and the refractive index of the light-transmitting substrate is preferably less than 0.01, more preferably less than 0.008, and still more preferably less than 0.006.

The optical functional layer (2) is a layer suitably provided for attaining anti-reflection properties, and is very thin, and thus interference fringes caused by provision of the optical functional layer (2) will not be a problem.

In the optical layered body of the present invention, the inflexion point of the sigmoid curve preferably shows the change in the refractive index of the optical functional layer (1) in the thickness direction on the opposite side of the light-transmitting substrate side (i.e. on the optical functional layer (2) side). When the optical functional layer (1) shows such a refractive index change, the production cost of the optical layered body of the present invention can be prevented from steeply rising. This is because of the following reason. That is, as described later, the optical functional layer (1) can be suitably produced by simultaneously applying the second optical functional layer (1) composition containing refractive-index adjustment particles and the first optical functional layer (1) composition free from the refractive-index adjustment particles, and dispersing the refractive-index adjustment particles in the coating film formed from the second optical functional layer (1) composition into the coating film formed from the first optical functional layer (1) composition. Here, if the optical layered body is designed to have the inflexion point of the sigmoid curve on the light-transmitting substrate side of the optical functional layer (1) in the thickness direction, a large amount of expensive refractive-index adjustment particles are required.

Also, in formation of the optical functional layer (1) showing the above refractive index change, the thickness of the coating film formed from the first optical functional layer (1) composition can be made larger than the thickness of the coating film formed from the second optical functional layer (1) composition. As a result, the resulting optical functional layer (1) can have excellent hard coat properties.

Furthermore, in the case of simultaneously applying the first optical functional layer (1) composition and the second optical functional layer (1) composition, excellent adhesion can be achieved between the coating films formed from these respective compositions, and the resulting optical functional layer (1) has excellent abrasion resistance.

The statement that "the inflexion point of the sigmoid curve shows the change in the refractive index of the optical functional layer (1) in the thickness direction on the opposite side of the light-transmitting substrate side" means that the refractive index point of the sigmoid curve appears at a position in the half of the thickness of the optical functional layer (1) on the opposite side of the light-transmitting substrate side (i.e. on the optical functional layer (2) side). The optical functional layer (1) formed from the first optical functional layer (1) composition and the second optical functional layer (1) composition can be designed to show a sigmoid curve having an inflection point which indicates a refractive-index change in the optical functional layer (1) on the optical functional layer (2) side in the thickness direction.

In the optical layered body of the present invention, the inflection point of the sigmoid curve preferably shows a change in the refractive index in the closest region to the optical functional layer (2) when the thickness of the optical functional layer (1) is equally divided into three regions. The inflection point of the sigmoid curve in the region can suitably prevent generation of interference fringes and suitably improve the anti-reflection properties of the optical layered body having the optical functional layer (2).

In the case of producing the optical functional layer (1) by simultaneously applying the later-described first optical functional layer (1) composition and second optical functional layer (1) composition, the adhesion between the coating films formed from these respective compositions is excellent, and the abrasion resistance of the optical functional layer (1) produced is also excellent.

Preferably, the optical functional layer (1) contains refractive-index adjustment particles uneven distributed on the optical functional layer (2) side, and when, in a cross-section of the optical functional layer (1) in the thickness direction, a region within 2 μm from the interface on the light-transmitting substrate side is a region (1), a region within 2 μm from the interface on the side opposite to the light-transmitting substrate side is a region (3), and a region between the region (1) and the region (3) is a region (2), an area ratio of the refractive-index adjustment particles in the region (1) is 0 to 8%, an area ratio of the refractive-index adjustment particles in the region (2) is 9 to 40%, and an area ratio of the refractive-index adjustment particles in the region (3) is 41 to 80%.

The refractive-index adjustment particles control the refractive index of the optical functional layer (1), i.e., specifically, they increase the refractive index of the optical functional layer (1). The optical layered body of the present invention containing the refractive-index adjustment particles in such an area ratio in the optical functional layer (1) can suitably prevent generation of interference fringes and suitably improve the anti-reflection properties. In the case of producing the optical functional layer (1) by simultaneously applying the later-described first optical functional layer (1) composition and second optical functional layer (1) composition, the adhesion between the coating films formed from these respective compositions is excellent, and the abrasion resistance of the optical functional layer (1) produced is also excellent.

The area ratio of the refractive-index adjustment particles in a cross-section of the optical functional layer (1) in the thickness direction can be determined by binarizing a cross-sectional photograph (showing the amount of particles as an area) taken by a TEM using image analysis software Win Roof (Mitani Corporation, Visual System Division).

Also, the expression "the optical functional layer (1) contains refractive-index adjustment particles uneven distributed on the optical functional layer (2) side" means that the area ratios of the refractive-index adjustment particles in the region (1), region (2), and region (3) in a cross-section of the optical functional layer (1) satisfy the relation of region (1)<region (2)<region (3).

The area ratio of the refractive-index adjustment particles in the region (1) is preferably 0 to 8%. An area ratio of higher than 8% may increase the refractive index difference in the interface between the light-transmitting substrate and the optical functional layer (1), causing interference fringes. Since the preferred lower limit of the area ratio of the refractive-index adjustment particles in the region (1) is 0%, the refractive-index adjustment particles may not be contained in the region (1). In this case, the refractive index of the region (1) is the refractive index of the later-described ultraviolet-curable resin constituting the optical functional layer (1). The upper limit of the area ratio of the refractive-index adjustment particles in the region (1) is more preferably 5%. Setting the lower limit of the area ratio of the refractive-index adjustment particles in the region (1) to 0% and the upper limit to 8% enables suppression of generation of interference fringes in the interface between the light-transmitting substrate and the optical functional layer (1). In the case of producing the optical functional layer (1) by simultaneously applying the later-described first optical functional layer (1) composition and second optical functional layer (1) composition, the adhesion between the coating films formed from these respective compositions is excellent, and the abrasion resistance of the optical functional layer (1) produced is also excellent.

The refractive-index adjustment particles in the region (2) are preferably dispersed without evenness such that the refractive index of the optical functional layer (1) in the thickness direction continuously changes to show the above sigmoid curve. Specifically, the area ratio of the refractive-index adjustment particles in the region (2) is preferably 9 to 40%. An area ratio of lower than 9% may increase a difference in the refractive index between the region (3) and the region (2) in the optical functional layer (1) to cause interference fringes in the interface between the region (3) and the region (2). An area ratio of higher than 40% may increase a difference in the refractive index between the region (1) and the region (2) in the optical functional layer (1) to cause interference fringes in the interface between the region (1) and the region (2). The upper limit of the area ratio of the refractive-index adjustment particles in the region (2) is more preferably 20%. Setting the lower limit of the area ratio of the refractive-index adjustment particles in the region (2) to 9% and the upper limit to 40% enables the refractive index to continuously change in the thickness direction to show a sigmoid curve, suppressing generation of interference fringes.

The area ratio of the refractive-index adjustment particles in the region (3) is preferably 41 to 80%. An area ratio of lower than 41% may not allow the optical functional layer (1) to achieve a sufficient refractive index, thereby failing to attain sufficient optical properties when the later-described optical functional layer (2) and a low-refractive-index layer are laminated. An area ratio of higher than 80% may make no difference in the refractive index between the optical functional layer (1) and the optical functional layer (2) in the case that the high-refractive-index particles and the refractive-index adjustment particles formed from the same material are added to the later-described optical functional layer (2), thereby failing to give sufficient anti-reflection properties to the optical layered body of the present invention. The lower limit of the area ratio of the refractive-index adjustment particles in the region (3) is more preferably 60%, and the upper limit is more preferably 70%. Setting the lower limit of the area ratio of the refractive-index adjustment particles in the region (3) to 41% and the upper limit to 80% may produce an optical functional layer (1) having a desired refractive index ratio without interference fringes.

The inflection point of the sigmoid curve is preferably in the region (3).

The refractive-index adjustment particles preferably have an average particle size of 1 to 100 nm; here, the upper limit is more preferably 20 nm. An average particle size of smaller than 1 nm may make it difficult to prevent aggregation. An average particle size of larger than 100 nm may make it difficult to control the positions of the refractive-index adjustment particles, and thus the refractive index of the optical functional layer (1) may not continuously change in the thickness direction to show a sigmoid curve.

The average particle size herein means the average of 20 refractive-index adjustment particles observed in a transmission electron microscope (TEM) photograph of a cross-section of the optical functional layer (1), and may be of primary particles or secondary particles if it is 1 to 100 nm.

The refractive-index adjustment particles preferably have a refractive index of 1.50 to 2.80.

A refractive index of less than 1.50 may not allow control of the refractive index of the optical functional layer (1) in the thickness direction to change to show the above sigmoid curve, failing to give sufficient interference-fringe preventing ability and sufficient anti-reflection properties to the optical layered body of the present invention. Particles having a high refractive index of higher than 2.80 are not preferred because they are very expensive.

Examples of the material constituting the refractive-index adjustment particles include metal oxide fine particles. Specific examples of the metal oxide fine particles include titanium oxide ($TiO_2$, refractive index: 2.71), zirconium oxide ($ZrO_2$, refractive index: 2.10), cerium oxide ($CeO_2$, refractive index: 2.20), tin oxide ($SnO_2$, refractive index: 2.00), antimony tin oxide (ATO, refractive index: 1.75 to 1.95), indium tin oxide (ITO, refractive index: 1.95 to 2.00), phosphorus tin oxide (PTO, refractive index: 1.75 to 1.85), antimony oxide ($Sb_2O_5$, refractive index: 2.04), aluminum zinc oxide (AZO, refractive index: 1.90 to 2.00), gallium zinc oxide (GZO, refractive index: 1.90 to 2.00), and zinc antimonate ($ZnSb_2O_6$, refractive index: 1.90 to 2.00). Among these metal oxide fine particles, tin oxide ($SnO_2$), antimony tin oxide (ATO), indium tin oxide (ITO), phosphorus tin oxide (PTO), antimony oxide ($Sb_2O_5$), aluminum zinc oxide (AZO), gallium zinc oxide (GZO), and zinc antimonate ($ZnSb_2O_6$) have an advantage in that they are conductive metal oxides, and thus can control the dispersion state of the particles and form a conductive path to give an antistatic property.

Particularly, antimony oxide ($Sb_2O_5$) and zirconium oxide ($ZrO_2$, refractive index: 2.10), for example, are suitable.

The optical functional layer (2) is preferably provided on the optical functional layer (1), and contains high-refractive-index particles. Preferably, the high-refractive-index particles are uniformly dispersed in the optical functional layer (2). The thickness of the optical functional layer (2) is described later.

The high-refractive-index particles may be of an appropriately selected material having a higher refractive index than the refractive-index adjustment particles in the optical functional layer (1) described above, or may be the same fine particles as the above high-refractive-index particles but in an increased amount.

The optical layered body of the present invention having at least the optical functional layer (1) on one surface of the light-transmitting substrate is produced by, for example, forming a laminated coating film by simultaneously applying a first optical functional layer (1) composition and a second optical functional layer (1) composition for forming the optical functional layer (1) to one surface of the light-transmitting substrate such that the first optical functional layer (1) composition is on the light-transmitting substrate side; pre-curing the laminated coating film using a light-emitting diode; drying the pre-cured laminated coating film; and forming the optical functional layer (1) by fully curing the dried laminated coating film, wherein the first optical functional layer (1) composition and the second optical functional layer (1) composition contain respective photopolymerization initiators having absorption in different wavelength regions.

Such a method for producing an optical layered body including steps as described above is another aspect of the present invention.

The method for producing an optical layered body of the present invention can form the optical functional layer (1) of which the refractive index continuously changes to show a sigmoid curve. Such a layer can be formed presumably for the following reason.

That is, in the step of forming the laminated coating film, the first optical functional layer (1) composition and the second optical functional layer (1) composition for forming the optical functional layer (1) are simultaneously applied to one surface of the light-transmitting substrate, so that a laminated coating film is formed. In the laminated coating film, the coating film formed from the second optical functional layer (1) composition constitutes the optical functional layer (1) on the opposite side of the light-transmitting substrate side, and has a higher refractive index than the coating film formed from the first optical functional layer (1) composition. Since the coating film formed from the second optical functional layer (1) composition and the coating film formed from the first optical functional layer (1) composition are directly laminated, the component (specifically, refractive-index adjustment particles) contained in the coating film formed from the second optical functional layer (1) composition can be dispersed in the coating film formed from the first optical functional layer (1) composition.

Subsequently, in the step of pre-curing the laminated coating film, the coating film formed from the second optical functional layer (1) composition is pre-cured while the coating film formed from the first optical functional layer (1) composition is prevented from curing. Thereby, the refractive-index adjustment particles in the coating film formed from the second optical functional layer (1) composition can be prevented from being dispersed in the coating film formed from the first optical functional layer (1) composition. As a result, the refractive-index adjustment particles are concentrated in the coating film (coating film formed from the second optical functional layer (1) composition) on the opposite side of the light-transmitting substrate side of the laminated coating film constituting the optical functional layer (1).

Through the steps of drying the pre-cured laminated coating film and curing the dried laminated coating film, presumably, the optical functional layer (1) of which the refractive index continuously changes to show a sigmoid curve can be formed.

In the method for producing an optical layered body according to the present invention, the first optical functional layer (1) composition and the second optical functional layer (1) composition contain the respective photopolymerization initiators having absorption in different wavelength regions.

In the following description, the photopolymerization initiator contained in the first optical functional layer (1) composition is also referred to as a "first photopolymerization initiator", and the photopolymerization initiator contained in the second optical functional layer (1) composition is also referred to as a "second photopolymerization initiator".

Here, the expression "polymerization initiators having absorption in different wavelength regions" means that the wavelength region in which the polymerization is promoted by the first photopolymerization initiation is different from the wavelength region in which the polymerization is promoted by the second photopolymerization initiator. The "wavelength region in which the polymerization is promoted" refers to a wavelength region in which the absorbance is more than 100 ml/g·cm.

In the present invention, preferably, the wavelength region in which the polymerization is promoted by the first photopolymerization initiator does not include the wavelengths of the light irradiated in the later-described step of pre-curing the laminated coating film, and the wavelength region in which the polymerization is promoted by the second photopolymerization initiator includes the wavelengths of the light irradiated in the later-described step of pre-curing the laminated coating film.

When the first optical functional layer (1) composition contains the first photopolymerization initiator and the second optical functional layer (1) composition contains the second photopolymerization initiator, the coating film formed from the second optical functional layer (1) composition is pre-cured while the coating film formed from the first optical functional layer (1) composition is hardly cured or is gently cured in the step of pre-curing the laminated coating film. As a result, in the step of drying the pre-cured laminated coating film, the solvent contained in the laminated coating film can be sufficiently removed, generation of bubbles attributed to the residual solvent in the coating film formed from the first optical functional layer (1) composition can be suitably prevented, and the resulting optical layered body can be prevented from being whitened. Furthermore, an unexpected decrease in the refractive index of the resulting optical functional layer (1) can be prevented.

The second optical functional layer (1) composition preferably contains an ultraviolet-curable resin, high-refractive-index particles, a photopolymerization initiator (second photopolymerization initiator) with an absorption coefficient of more than 100 ml/g·cm (preferably at least 120 ml/g·cm) at a wavelength of at least 360 nm, and a solvent.

The ultraviolet-curable resin may be, for example, monomers, oligomers, or polymers which have a curing-reactive functional group that, by the effect of the second photopolymerization initiator, indirectly causes a reaction to form large molecules, such as polymerization or dimerization. Specifically, radical polymerizable monomers or oligomers with a group having an ethylenically unsaturated bond, such as a (meth)acryloyl group, a vinyl group, or an allyl groups, are preferred, and a polyfunctional resin component with at least two, preferably at least three curing-reactive functional groups in one molecule is preferred to cause crosslinking between the molecules of the resin component.

The (meth)acryloyl group refers to an acryloyl group and a methacryloyl group.

Specific examples of the ultraviolet-curable resin include ethyl(meth)acrylate, ethylhexyl(meth)acrylate, styrene, methylstyrene, N-vinyl pyrrolidone, polymethylolpropane tri(meth)acrylate, hexandiol(meth)acrylate, tripropylene glycol di(meth)acrylate, diethylene glycol di(meth)acrylate, pentaerythritol tri(meth)acrylate, pentaerythritol tetra(meth)acrylate, dipentaerythritol penta(meth)acrylate, dipentaerythritol hexa(meth)acrylate, 1,6-hexanediol di(meth)acrylate, neopentyl glycol di(meth)acrylate, and polyfunctional compounds obtained by modifying the above compounds with ethylene oxide (50) or propylene oxide (PO), for example; and reaction products of the polyfunctional compounds and a compound such as a (meth)acrylate (e.g. poly(meth)acrylate ester of a polyol). The "(meth)acrylate" herein refers to methacrylate and acrylate. Particularly, at least trifunctional (meth)acrylates are preferred.

In addition to the above compounds, polyester resins, polyether resins, acrylic resins, epoxy resins, urethane resins, alkyd resins, spiroacetal resins, polybutadiene resins, and polythiol polyene resins which have an ethylenic unsaturated bond and a comparatively low molecular weight, for example, can be used as the ultraviolet-curable resin.

The second photopolymerization initiator contained in the second optical functional layer (1) composition preferably has an absorption coefficient of more than 100 ml/g·cm (more preferably at least 120 ml/g·cm) at a wavelength of at least 360 nm. With such a second photopolymerization initiator, the optical functional layer (1) formed through the later-described steps can have a refractive index which continuously changes to show the above sigmoid curve. This reason is described later in more detail.

If the absorption peaks of the second photopolymerization initiator are out of the above range, the coating film formed from the second optical functional layer (1) composition may not be fully cured in the step of pre-curing the laminated coating film. As a result, the refractive-index adjustment particles in the coating film formed from the second optical functional layer (1) composition may not be sufficiently prevented from being dispersed in the coating film formed from the first optical functional layer (1) composition, which may result in failure in forming an optical functional layer (1) of which the refractive index continuously changes to show a sigmoid curve.

Specific examples of the second photopolymerization initiator include bis(2,4,6-trimethylbenzoyl)-phenylphosphine oxide, 1,2-octanedione, 1-[4-(phenylthio)-, 2-(O-benzoyloxime)], 2-benzyl-2-dimethylamino-1-(4-morpholinophenyl)-butanone-1,2-dimethylamino-2-(4-methyl-benzyl)-1-(4-morpholin-4-yl-phenyl)-butan-1-one, bis($\eta^5$-2,4-cyclopentadien-1-yl)-bis(2,6-difluoro-3-(1H-pyrrol-1-yl)-phenyl)titanium, 2-methyl-1-[4-(methylthio)phenyl]-2-morpholinopropan-1-one, a mixture of 2-benzyl-2-dimethylamino-1-(4-morpholinophenyl)-butanone-1 and 2,2-dimethoxy-1,2-diphenylethan-1-one, a mixture of 1-hydroxy-cyclohexyl-phenyl-ketone and bis(2,6-dimethoxybenzoyl)-2,4,4-trimethylpentyl phosphine oxide, 2-hydroxy-2-methyl-1-phenyl-propan-1-one, 2,4,6-trimethylbenzoyl-diphenyl-phosphine oxide, a mixture of 2,4,6-trimethylbenzoyl-diphenyl-phosphine oxide and 2-hydroxy-2-methyl-1-phenyl-propane-1-ketone, and ethanone-1-[9-ethyl-6-(2-methylbenzoyl)-9H-carbazol-3-yl]-1-(O-acetyloxime). Preferred among these are, for example, bis(2,4,6-trimethylbenzoyl)-phenylphosphine oxide, 1,2-octanedione, 1-[4-(phenylthio)-, 2-(O-benzoyloxime)], 2,4,6-trimethylbenzoyl-diphenyl-phosphine oxide.

Examples of the commercially available products of the second photopolymerization initiator include IRGACURE 819, IRGACURE OXE01, IRGACURE 369, IRGACURE 379, IRGACURE 784, IRGACURE 907, IRGACURE 1300, IRGACURE 1800, DAROCUR 1173, Lucirin TPO, DAROCUR 4265, and CGI242 (all from BASF Japan). Preferred among these are, for example, IRGACURE 819, IRGACURE OXE01, and Lucirin TPO.

The amount of the second photopolymerization initiator is not particularly limited, but is preferably 0.1 to 20 parts by mass for each 100 parts by mass of the ultraviolet-curable resin. An amount of less than 0.1 parts by mass may cause insufficient curing of the coating film formed from the second optical functional layer (1) composition. An amount of more than 20 parts by mass may give insufficient hardness to the resulting optical functional layer (1). The lower limit of the amount of the second photopolymerization initiator is more preferably 4 parts by mass, and the upper limit is more preferably 10 parts by mass.

Examples of the solvent include alcohols (e.g., methanol, ethanol, propanol, isopropanol, n-butanol, s-butanol, t-butanol, benzyl alcohol, propylene glycol monomethyl ether, ethylene glycol), ketones (e.g., acetone, methyl ethyl ketone, methyl isobutyl ketone, cyclopentanone, cyclohexanone, heptanone, diisobutyl ketone, diethyl ketone), aliphatic hydrocarbons (e.g., hexane, cyclohexane), halogenated hydrocarbons (e.g., methylene chloride, chloroform, carbon tetrachloride), aromatic hydrocarbons (e.g., benzene, toluene, xylene), amides (e.g., dimethylformamide, dimethylacetamide, n-methylpyrrolidone), ethers (e.g., diethylether, dioxane, tetrahydrofuran), and ether alcohols (e.g., 1-methoxy-2-propanol), and esters (e.g., methyl acetate, ethyl acetate, butyl acetate, isopropyl acetate).

Among these, methyl isobutyl ketone and/or methyl ethyl ketone are/is preferred as the solvent because the above ultraviolet-curable resin and the refractive-index adjustment particles can be melted or dispersed and the second optical functional layer (1) composition can be suitably applied.

The amount of the solvent is not particularly limited, but the viscosity of the second optical functional layer (1) composition is preferably suitably controlled to be in the later-described range.

The second optical functional layer (1) composition preferably has a viscosity of 2 mPa·s to 100 mPa·s. A viscosity of lower than 2 mPa·s may make it difficult to retain the shape of the coating film formed from the second optical functional layer (1) composition. A viscosity of higher than 100 mPa·s may not allow simultaneous application of the second optical functional layer (1) composition and the first optical functional layer (1) composition. The upper limit of the viscosity is more preferably 30 mPa·s.

The viscosity of the second optical functional layer (1) composition can be measured by dropping an appropriate amount of the target composition (ink) using MCR301 (product of Anton Paar) with PP50 as a measuring instrument, at a measuring temperature of 25° C. and a shear rate of 10000 [1/s].

The second optical functional layer (1) composition can be prepared by, for example, mixing and dispersing the ultraviolet-curable resin, high-refractive-index particles, and the second photopolymerization initiator in the above solvent.

The mixing and dispersing may be favorably performed using a known device such as a paint shaker, a bead mill, or a kneader.

The thickness of the coating film of the second optical functional layer (1) composition is preferably 1 to 10 μm in terms of the thickness after the curing. A thickness of smaller than 1 μm may make it difficult to control the refractive index in the interface with the functional layer (2). A thickness of greater than 10 μm may not only make it difficult to reduce the cost but also cause curling. The lower limit of the thickness of the coating film formed from the second optical functional layer (1) composition is more preferably 3 and the upper limit is more preferably 8 μm.

The first optical functional layer (1) composition preferably contains an ultraviolet-curable resin, a photopolymerization initiator (first photopolymerization initiator) having an absorption coefficient of 100 ml/g·cm at most (preferably 90 ml/g·cm at most) at a wavelength of at least 360 nm, and a solvent.

Examples of the ultraviolet-curable resin for the first optical functional layer (1) composition include the same compounds mentioned as the examples of the second optical functional layer (1) composition.

In the present invention, the ultraviolet-curable resin in the first optical functional layer (1) composition preferably has a weight average molecular weight of 1000 to 50000. A weight average molecular weight in such a range can give the resulting coating film a suitable viscosity for dispersion of the refractive-index adjustment particles of the second optical functional layer (1) composition, and can more suitably prevent interference fringes in the interface between the resulting optical functional layer (1) and the light-transmitting substrate.

The weight average molecular weight of the ultraviolet-curable resin can be determined by polystyrene conversion using gel permeation chromatography (GPC). The solvent for the GPC mobile phase can be tetrahydrofuran or chloroform. The measurement column may be a combination of commercially available columns for tetrahydrofuran or chloroform. Examples of the commercially available columns include Shodex GPC KF-801, GPC KF-802, GPC KF-803, GPC KF-804, GPC KF-805, and GPC-KF 800D (all are product names, from Showa Denko K.K.). For the detector, an RI (differential refractive index) detector and a UV detector may be used. With such a solvent, a column, and a detector, the weight average molecular weight can be appropriately determined using a GPC system such as Shodex GPC-101 (product of Showa Denko K.K.).

The first photopolymerization initiator has an absorption coefficient of 100 ml/g·cm at most, preferably 90 ml/g·cm at most, at a wavelength of at least 360 nm. The first photopolymerization initiator can prevent excessive curing of the coating film formed from the first optical functional layer (1) composition in the pre-curing step.

If the absorption peaks of the first photopolymerization initiator are out of the above range, the coating film of the first optical functional layer (1) composition may be cured too much in the step of pre-curing the laminated coating film.

Specific examples of the first photopolymerization initiator include 1-hydroxy-cyclohexyl-phenyl-ketone, iodonium, a mixture of (4-methylphenyl)[4-(2-methylpropyl)phenyl]-hexafluorophosphate(1-) and propylene carbonate, 2,2-dimethoxy-1,2-diphenylethan-1-one, a mixture of oxyphenylacetic acid, 2-[2-oxo-2-phenylacetoxyethoxy]ethyl ester, oxyphenylacetic acid, and 2-(2-hydroxyethoxy)ethyl ester, 1-[4-(2-hydroxyethoxy)-phenyl]-2-hydroxy-2-methyl-1-propan-1-one, 2-hydroxy-2-methyl-1-phenyl-propan-1-one, ethyl-4-dimethylaminobenzoate, and 2-ethylhexyl-4-dimethylaminobenzoate. Preferred among these are, for example, 1-hydroxy-cyclohexyl-phenyl-ketone and 2,2-dimethoxy-1,2-diphenylethan-1-one.

Examples of the commercially available products of the first photopolymerization initiator include IRGACURE 184, IRGACURE 250, IRGACURE 651, IRGACURE 754, IRGACURE 2959, DAROCUR 1173, DAROCUR EDB, and DAROCUR EHA (all from BASF Japan), and preferred among these are, for example, IRGACURE 184 and IRGACURE 651.

The amount of the first photopolymerization initiator is not particularly limited, but is preferably 0.1 to 20 parts by mass for each 100 parts by mass of the ultraviolet-curable resin. An amount of less than 0.1 parts by mass may cause insufficient curing of the coating film formed from the first optical functional layer (1) composition. An amount of more than 20 parts by mass may cause insufficient curing of the resulting optical functional layer (1). The lower limit of the amount of the first photopolymerization initiator is more preferably 4 parts by mass, and the upper limit is more preferably 10 parts by mass.

Examples of the solvent for the first optical functional layer (1) composition include the same compounds mentioned as the examples of the solvent for the second optical functional layer (1) composition as described above.

The first optical functional layer (1) composition preferably contains the same solvent as the second optical functional layer (1) composition. Since the second optical functional layer (1) composition and the first optical functional layer (1) composition are simultaneously applied in the present invention, a defect such as coating undulations may occur in application if the first optical functional layer (1) composition and the second optical functional layer (1) composition contain the respective different solvents.

If the light-transmitting substrate is formed from an acrylic resin (acrylic resin or methacrylic resin) or cycloolefin resin, the solvent to be used is preferably limited. Differently from conventionally used substrates such as a TAC substrate, light-transmitting substrates produced from these materials are swollen and dissolved in almost every kind of solvent. That is, the light-transmitting substrate is greatly affected by the solvent, and may crack if the degree of swelling is too high. Hence, the solvent for the first optical functional layer (1) composition and the solvent for the second optical functional layer (1) composition are preferably selected from the following solvents.

That is, in the case that the light-transmitting substrate is formed from an acrylic resin, alcohols (methanol, ethanol, isopropanol, 1-butanol) are preferred, and other solvents with a greater number of carbon atoms appear to be favorable; particularly, solvents with a high vapor rate tend to be favorable. Examples thereof include methyl isobutyl ketone in the case of ketones, toluene in the case of aromatic hydrocarbons, and propylene glycol monomethyl ether in the case of glycols. The solvent may be a mixed solvent of these.

Especially in the present invention, for the compatibility with the resin component, excellent applicability, and no defects of cutting of the substrate during the process, the solvent preferably contains at least one selected from methyl isobutyl ketone, isopropanol, 1-butanol, and propylene glycol monomethyl ether. With any of these solvents, a light-transmitting substrate formed from an acrylic resin can swell moderately without cracking, and suitable adhesion to the resulting optical functional layer (1) can be achieved.

In contrast, esters (e.g., methyl acetate, ethyl acetate, propyl acetate, butyl acetate), ketones (e.g., acetone, methyl ethyl ketone, cyclohexanone, diacetone alcohol), ethers (e.g., dioxane, tetrahydrofuran, propylene-glycol-monomethyl-ether acetate), aliphatic hydrocarbons (e.g., hexane), aromatic hydrocarbons (e.g., xylene), halocarbons (e.g., dichloromethane, dichloroethane), cellosolves (e.g., methyl cellosolve, ethyl cellosolve), cellosolve acetates, sulfoxides (e.g., dimethyl sulfoxide), and amides (e.g., dimethylformamide, dimethylacetamide) are preferably not used because they may excessively swell the light-transmitting substrate produced from an acrylic resin, easily causing a defect where the light-transmitting substrate cracks under tension. Still, depending on the resins contained in the first optical functional layer (1) composition and the second optical functional layer (1) composition, the above solvent may be necessary to secure the compatibility. In that case, a solvent which is normally undesirable may be used in an amount of less than 25% of the entire solvent, and at least one preferred solvent may be used in an amount of at least 75%.

Also, if the light-transmitting substrate is formed from a cycloolefin resin, the substrate has an even more different nature from the substrate formed from an acrylic resin. Such a light-transmitting substrate is merely dissolved when a composition containing a solvent is applied, but the dissolvability does not allow the substrate to be impregnated with the resin composition, thereby resulting in no adhesion. That is, on the substances dissolved out by the solvent, a resin composition is floated. If a solvent having a high dissolving power constitutes 100% of the solvent, only the light-transmitting substrate itself is dissolved, failing to achieve properties such as adhesion, and defects such as cracking during processing as in the case of a light-transmitting substrate formed from an acrylic resin are likely to occur. In the case of a light-transmitting substrate formed from a cycloolefin resin, solvents of which the use is preferably restricted are, for example, aromatic hydrocarbons such as toluene and xylene. If these solvents are used, they should not be used in an amount of 100% of the entire solvent, and are preferably used in an amount of about 50% of the entire solvent to be used together with other solvent(s). In the case of a light-transmitting substrate formed from COP, corona treatment, for example, achieves the adhesion to the light functional layer (1).

The first optical functional layer (1) composition preferably has a viscosity of 1 mPa·s to 100 mPa·s. A viscosity of lower than 1 mPa·s may make it difficult to retain the shape of the coating film formed from the first optical functional layer (1) composition. A viscosity of higher than 100 mPa·s may not allow simultaneous application of the first optical functional layer (1) composition and the second optical functional layer (1) composition. The lower limit of the viscosity is more preferably 2 mPa·s, and the upper limit is more preferably 30 mPa·s.

The viscosity of the first optical functional layer (1) composition can be determined in the same manner as in the case of the viscosity of the second optical functional layer (1) composition.

The first optical functional layer (1) composition can be prepared by, for example, mixing and dispersing the ultraviolet-curable resin and the first photopolymerization initiator in the above solvent.

The mixing and dispersing may be favorably performed using a known device such as a paint shaker, a bead mill, or a kneader.

The thickness of the coating film formed from the first optical functional layer (1) composition is preferably 1 to 10 μm in terms of the thickness after the curing. A thickness of smaller than 1 μm may not achieve sufficient hardness. A thickness of greater than 10 μm may not only make it difficult to reduce the cost but also cause curling of the optical layered body, leading to poor handleability or poor workability. The lower limit of the thickness of the coating film formed from the first optical functional layer (1) composition is more preferably 3 μm, and the upper limit is more preferably 8 μm.

The method of simultaneously applying the first optical functional layer (1) composition and the second optical functional layer (1) composition is preferably one using an extrusion die coater, for example. This method is not likely to cause a change in the physical properties of the coating liquid because of volatilization of the solvent, and achieves highly precise formation of the coating film.

After the formation of the laminated coating film, the step of pre-curing the laminated coating film is preferably performed before the refractive-index adjustment particles in the coating film formed from the second optical functional layer (1) composition are dispersed entirely in the coating film formed from the first optical functional layer (1) composition. Performing the steps of forming a laminated coating film and pre-curing enables the refractive-index adjustment particles contained in the coating film formed from the second optical functional layer (1) composition to be moderately dispersed into the coating film formed from the first optical functional layer (1) composition.

Examples of the step of pre-curing the laminated coating film include a method of irradiating the laminated coating film with ultraviolet light using an ultraviolet LED.

Since such an ultraviolet LED has a wavelength with a sharp peak and is not exothermic during irradiation, unexpected polymerization reaction in the optical functional layer (1) by heat can be prevented. Also, pre-curing of the laminated coating film by the ultraviolet LED results in sufficient reaction of the second photopolymerization initiator having absorption peaks in the above range in the coating film formed from the second optical functional layer (1) composition, promoting curing of the coating film formed from the second optical functional layer (1) composition. In contrast, the first photopolymerization initiator having absorption peaks in the above range in the coating film formed from the first optical functional layer (1) composition hardly reacts. As a result, the coating film formed from the second optical functional layer (1) composition can be cured while the coating film formed from the first optical functional layer (1) composition can be gently cured.

The ultraviolet LED is preferably irradiated in a cumulative amount of at least 400 mJ/cm$^2$, for example.

Also, the ultraviolet LED to be irradiated to the laminated coating film preferably has a peak wavelength at 360 to 400 nm, for example. Use of an ultraviolet LED having a peak wavelength in this range allows suitable pre-curing of the laminated coating film.

Examples of the method of drying the pre-cured laminated coating film in the step of drying the pre-cured laminated coating film include, but not particularly limited to, conventionally known methods.

The drying time for the laminated coating film in the step of drying of the pre-cured laminated coating film is preferably 20 seconds to 2 minutes, and more preferably 30 seconds to 1 minute. The drying temperature is preferably 40 to 90° C., and more preferably 50 to 80° C. The drying temperature is set to be lower than 100° C. to prevent defects such as heat wrinkle in the resultant optical functional layer (1).

Particularly in the case of a light-transmitting substrate formed from an acrylic resin or a cycloolefin resin, a drying temperature of higher than 100° C. may cause an increase in the penetrating power of the solvent to crack the light-transmitting substrate even when any of the above solvents giving preferred swelling to the light-transmitting substrate is selected. The drying temperature is therefore preferably basically 80° C. at most with any solvent because the impregnation power of the solvent may increase to crack the light-transmitting substrate. For example, methyl isobutyl ketone is a preferred solvent for a light-transmitting substrate formed from an acrylic resin. Even with this solvent, the light-transmitting substrate formed from an acrylic resin may crack under tension if the drying temperature reaches 100° C. The lowest temperature for the drying temperature is only required to be high enough to dry the solvent, and is preferably at least 50° C. For example, in the case that the solvent is methyl isobutyl ketone and the drying temperature is 30° C., the laminated coating film is cured by, for example, ultraviolet light, with the solvent being insufficiently dried. The curing does not succeed in this case, and uncured parts remain in the resulting optical functional layer (1). In this case, the adhesion between the light-transmitting substrate and the optical functional layer (1) may decrease.

In the step of forming the optical functional layer (1) by fully curing the dried laminated coating film, the method for fully curing the laminated coating film may be, for example, irradiating the laminated coating film with ultraviolet light. Specific examples of an ultraviolet light source for irradiating the ultraviolet light include light sources such as an ultrahigh pressure mercury lamp, a high pressure mercury vapor lamp, a low pressure mercury lamp, a carbon arc lamp, a black light fluorescent lamp, and halide lamp light.

The average thickness of the optical functional layer (1) formed through the above steps is preferably 5 to 20 and more preferably 6 to 16 µm.

An average thickness of the optical functional layer (1) in the above range gives sufficient pencil hardness and hard coat properties to the optical functional layer (1), and is less likely to cause curling in production, leading to favorable handling properties or workability.

The average thickness of the optical functional film (1) can be measured through cross-sectional microscopic observation of the optical layered body of the present invention.

The method for producing an optical layered body of the present invention preferably further includes the step of forming an optical functional layer (2) on the optical functional layer (1) formed through the above steps.

Examples of the method for forming the optical functional layer (2) include known coating methods such as roll coating, mayer bar coating, gravure coating, and die coating. The optical functional layer (2) may also be formed by a coating method (or dry coating method) using, for example, vacuum deposition, sputtering, plasma CVD, or ion plating.

The optical functional layer (2) preferably has an average thickness of 50 to 300 nm. If an average thickness of the optical functional layer (2) is in the above range, further formation of the later-described low-refractive-index layer on the optical functional layer (2) enables the optical layered body of the present invention to have a neutral color (to be colorless) and have excellent anti-reflection properties. The lower limit of the average thickness of the optical functional layer (2) is more preferably 100 µm, and the upper limit is more preferably 200 µm.

The optical layered body of the present invention produced through the above steps preferably has a total light transmittance of at least 85%. A total light transmittance of lower than 85% may deteriorate the color reproducibility and visibility when the optical layered body of the present invention is disposed on the surface of the image display device. The total light transmittance is more preferably at least 90%, and still more preferably at least 91%.

The total light transmittance can be measured by the method based on JIS K-7361 using a haze meter (product of Murakami Color Research Laboratory, product number: HM-150).

The optical layered body of the present invention preferably has a haze of 1% at most. A haze of higher than 1% may not lead to the desired optical properties, decreasing the visibility in the case that the optical layered body of the present invention is mounted on the image display surface.

The haze can be measured by the method based on JIS K-7136 using a haze meter (product of Murakami Color Research Laboratory, product number: HM-150).

The optical layered body of the present invention preferably further has a low-refractive-index layer on the optical functional layer (2). Further provision of the low-refractive-index layer enables the optical layered body of the present invention to have a neutral color (to be colorless).

Here, if it is only about the anti-reflection properties of the optical layered body, just laminating the optical functional layer (2) and the low-refractive-index layer on the light-transmitting substrate can achieve the anti-reflection properties. However, an optical layered body with such a structure shows a strong color of blue or red. In contrast, as in the case of the optical layered body of the present invention, if an optical functional layer (2) having a higher refractive index than the optical functional layer (1) is laminated on the optical functional layer (1) to a certain film thickness, and a low-refractive-index layer is further provided on the optical functional layer (2), a color can be eliminated. That is, in the case of providing the low-refractive-index layer, the optical functional layer (1) of the optical layered body of the present invention also has a function of adjusting the color.

The low-refractive-index layer is preferably formed from, for example, 1) a resin containing silica or magnesium fluoride, 2) a fluororesin which is a low-refractive-index resin, 3) a fluororesin containing silica or magnesium fluoride, or 4) a thin film of silica or magnesium fluoride. Examples of resins other than fluororesins include the same ultraviolet-curable resins mentioned as the examples of the second optical functional layer (1) composition.

The silica is preferably hollow silica fine particles which can be produced by, for example, the production method described in the examples in JP 2005-099778 A.

Each of these low-refractive-index layers preferably has a refractive index of 1.45 at most, particularly 1.42 at most.

The thickness of the low-refractive-index layer is not limited, and may typically be selected appropriately from the range of 30 nm to 1 µm.

A single low-refractive-index layer can achieve the effect, but multiple low-refractive-index layers may be appropriately used to attain a lower or higher minimum reflectance. In the case of providing multiple low-refractive-index layers, the low-refractive-index layers preferably have respective different refractive indexes and thicknesses.

The fluororesin may be a polymerizable compound containing at least a fluorine atom in a molecule, or a polymer thereof. The polymerizable compound is not particularly limited, but is preferably a compound containing a curing-reactive group such as a functional group curable by ionizing radiation or a thermosetting polar group. The polymerizable compound may alternatively be a compound containing both of these reactive groups. Unlike the polymerizable compound, a polymer does not contain such a reactive group at all.

The polymerizable compound containing a functional group curable by ionizing radiation may be any of various fluoromonomers having an ethylenically unsaturated bond. More specifically, fluoroolefins (e.g., fluoroethylene, vinylidene fluoride, tetrafluoroethylene, hexafluoropropylene, perfluorobutadiene, perfluoro-2,2-dimethyl-1,3-dioxol) can be mentioned. If the compound contains a (meth)acryloyloxy group, the compound may be, for example, a (meth) acrylate compound containing a fluorine atom in a molecule, such as 2,2,2-trifluoroethyl(meth)acrylate, 2,2,3,3,3-pentafluoropropyl(meth)acrylate, 2-(perfluorobutyl)ethyl(meth) acrylate, 2-(perfluorohexyl)ethyl(meth)acrylate, 2-(perfluorooctyl)ethyl(meth)acrylate, 2-(perfluorodecyl)ethyl(meth) acrylate, α-trifluoromethyl methacrylate, or α-trifluoroethyl methacrylate; or a fluorine-containing polyfunctional (meth) acrylic ester compound containing, in a molecule, at least two (meth)acryloyloxy groups and a $C_{1-14}$ fluoroalkyl, fluorocycloalkyl, or fluoroalkylene group containing at least three fluorine atoms.

Preferred thermosetting polar groups are, for example, hydrogen bond-forming groups such as hydrogen groups, carboxyl groups, amino groups, and epoxy groups. These polar groups have excellent compatibility with inorganic ultrafine particles such as silica particles, as well as adhesion to the coating film. Examples of the polymerizable compound containing a thermosetting polar group include 4-fluoroethylene-perfluoroalkyl vinyl ether copolymers; fluoroethylene-hydrocarbon vinyl ether copolymers; and fluorine-modified products of various resins such as epoxy, polyurethane, cellulose, phenol, and polyimide.

Examples of the polymerizable compound containing both a functional group curable by ionizing radiation and a thermosetting polar group include fully or partially fluorinated alkyls, alkenyls, aryl ethers, fully or partially fluorinated vinyl ethers, fully or partially fluorinated vinyl esters, or fully or partially fluorinated vinyl ketones, of acrylic acid or methacrylic acid.

Examples of the fluororesin include the following compounds: polymers of a monomer or monomer mixture which contains at least one of the fluorinated (meth)acrylate compounds of a polymerizable compound containing a ionizing radiation-curing group; copolymers of at least one of the above fluorinated (meth)acrylate compounds and a (meth) acrylate compound free from fluorine atoms in a molecule, such as methyl(meth)acrylate, ethyl(meth)acrylate, propyl(meth)acrylate, butyl(meth)acrylate, and 2-ethylhexyl (meth)acrylate; and homopolymers or copolymers of fluoromonomers, such as fluoroethylene, vinylidene fluoride, trifluoroethylene, chlorotrifluoroethylene, 3,3,3-trifluoropropylene, 1,1,2-trichloro-3,3,3-trifluoro propylene, and hexafluoropropylene. Also, silicone-containing vinylidene fluoride copolymers obtained by adding a silicone component to the above copolymers can be used. Examples of the silicone component include (poly)dimethyl siloxane, (poly)diethyl siloxane, (poly)diphenyl siloxane, (poly)methyl phenyl siloxane, alkyl-modified (poly)dimethyl siloxane, azo group-containing (poly)dimethyl siloxane, dimethyl silicone, phenyl methyl silicone, alkyl/aralkyl-modified silicone, fluorosilicone, polyether-modified silicone, fatty acid ester-modified silicone, methyl hydrogen silicone, silanol group-containing silicone, alkoxy group-containing silicone, phenolic group-containing silicone, methacryl-modified silicone, acryl-modified silicone, amino-modified silicone, carboxylic acid-modified silicone, carbinol-modified silicone, epoxy-modified silicone, mercapto-modified silicone, fluorine-modified silicone, and polyether-modified silicone. Especially, compounds having a dimethyl siloxane structure are preferred.

The non-polymers and polymers containing the compounds described below can also be used for the fluororesin. That is, the following compounds can be used, for example: compounds obtainable by reacting a fluorine-containing compound containing at least one isocyanato group in a molecule and a compound containing, in a molecule, at least one functional group reactive with the isocyanato group, such as an amino group, a hydroxyl group, or a carboxyl group; and compounds obtainable by reacting a isocyanato group-containing compound and a fluorine-containing polyol such as a fluorine-containing polyether polyol, a fluorine-containing alkyl polyol, a fluorine-containing polyester polyol, or a fluorine-containing ε-caprolactone-modified polyol.

Together with the polymerizable compound or polymer containing a fluorine atom, any of the ultraviolet-curable resins mentioned as the examples of the second optical functional layer (1) composition can be used. Also appropriately used are a curing agent for curing a reactive group, for example, and various additives and solvents for improving the coatability or giving antifouling properties.

In formation of the low-refractive-index layer, the viscosity of the low-refractive-index composition containing components such as a low-refractive-index agent and a resin is preferably set to a value in the range of 0.5 to 5 mPa·s (25° C.), more preferably to 0.7 to 3 mPa·s (25° C.), for preferred coating properties. With such a viscosity, a uniform thin film without coating unevenness can be formed, and a low-refractive-index layer having particularly excellent adhesion can be formed.

The curing method for the resin may be the same as the method described for the optical functional layer (1). If heating is performed for curing treatment, the fluororesin composition preferably contains a thermal polymerization initiator which produces radials under heat to allow polymerization of a polymerizable compound to start, for example.

The film thickness (nm) $d_A$ of the low-refractive-index layer preferably satisfies the following formula (1):

$$d_A = m\lambda/(4n_A) \qquad (1)$$

(wherein $n_A$ represents the refractive index of the low-refractive-index layer;
m represents a positive odd number, preferably 1; and
λ is a wavelength which is preferably a value in the range of 480 to 580 nm).

The low-refractive-index layer in the present invention preferably satisfies the following formula (2):

$$120 < n_A d_A < 145 \qquad (2)$$

in terms of decreasing the reflectance.

In the optical layered body of the present invention, other single or multiple layers (e.g. anstistatic layer, anti-fouling layer, adhesive layer, hard coat layer) may be appropriately formed as needed if the effect of the present invention is not deteriorated. The optical layered body preferably has at least one of an antistatic layer and an anti-fouling layer. These layers may be the same as those for known anti-reflection laminated bodies.

The optical layered body of the present invention can be formed into a polarizer when it has a polarizing element on a surface of the light-transmitting substrate opposite to the surface on which the optical functional layer (1) is provided. Such a polarizer is yet another aspect of the present invention.

The polarizing element may be any material such as a polyvinyl alcohol film, a polyvinyl formal film, a polyvinyl acetal film, and an ethylene-vinyl acetate copolymer saponified film which have been dyed with, for example, iodine, and stretched. In laminating the polarizing element and the optical layered body of the present invention, the light-transmitting substrate (triacetyl cellulose film) is preferably subjected to saponification. The saponification gives adhesion, and also provides an antistatic effect.

An image display device including the optical layered body or the polarizer is yet another aspect of the present invention.

The image display device may be, for example, an LCD, PDP, FED, ELD (organic EL, inorganic EL), CRT, tablet PC, touch panel, or electronic paper.

An LCD, which is a representative example of the image display device, includes a transparent display and a lighting system for irradiating the transparent display from the back. In the case that the image display device of the present invention is an LCD, the image display device has the optical layered body of the present invention or the polarizer of the present invention on the surface of the transparent display.

In the case that the present invention relates to an LCD with the optical layered body, the optical layered body is irradiated by the light source of the lighting system from its bottom side. An STN liquid crystal display device may have a retardation plate between a liquid crystal display element and a polarizer. The liquid crystal display device may optionally have an adhesive layer between one layer and the next.

A PDP, which is an example of the image display device, has a front glass substrate (with an electrode on the surface) and a back glass substrate (with an electrode and a small groove on the surface, the groove having red, green, and blue fluorescent layers therein) facing the front glass substrate, with discharge gas enclosed between the substrates. In the case that the image display device of the present invention is a PDP, the display device has the above optical layered body on the surface of the front glass substrate or the front plate (glass substrate or film substrate) of the front glass substrate.

The image display device may be another image display device such as an ELD device configured to provide display by controlling the voltage applied to the glass substrate where zinc sulfide or a diamine substance which emits light under voltage, i.e., a light-emitting material, is deposited; or a CRT configured to convert electric signals into light and produce images that are visible to human eyes. In this case, each of the above display devices has the above optical layered body, on its outermost surface or on the surface of the front plate.

In any case, the image display device of the present invention can be used for display on televisions, computers, electronic paper, touch panels, or tablet PCs, for example. Particularly, the optical layered body of the present invention can be suitable for use on the surface of high definition image displays, such as CRTs, liquid crystal panels, PDPs, ELDs, FEDs, touch panels, electronic paper, and tablet PCs.

Advantageous Effects of Invention

The optical layered body of the present invention has an optical functional layer formed by laminating multiple coating films formed from materials of which the refractive indexes are greatly different on one surface of a light-transmitting substrate. The optical functional layer, having the above structure, can suitably prevent interfacial reflection and interference fringes in the interfaces between the layers.

The optical layered body of the present invention can therefore be particularly suitable for cathode ray tube (CRT) displays, liquid crystal displays (LCD), plasma displays (PDP), electroluminescence displays (ELD), field emission displays (FED), and electronic paper, for example.

DESCRIPTION OF EMBODIMENTS

Figure 1:
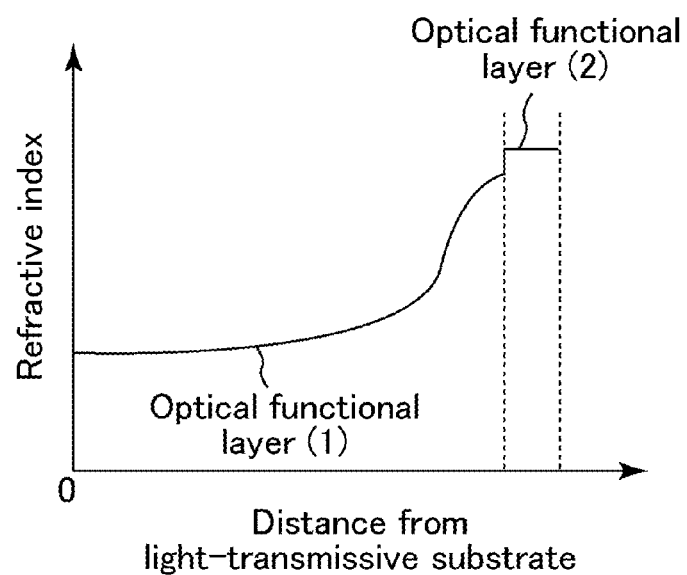
FIG. 1 is a graph showing a change in the refractive index of the optical layered body of the present invention in the optical functional layer (1) and the optical functional layer (2) in the thickness direction.

The present invention will be described based on the following examples which, however, are not intended to limit the scope of the present invention. Unless otherwise specified, the expressions "part(s)" and "%" are based on mass.

An $Sb_2O_5$ dispersion produced by JGC Catalysts and Chemicals Ltd., available under the trade name DP-1153SBV, was used as a refractive-index adjustment particle sol.

An ATO dispersion produced by JGC Catalysts and Chemicals Ltd., available under the trade name DP-1134ATV, was used as a high-refractive-index fine particle sol.

A polyfunctional urethane acrylate produced by Shin-Nakamura Chemical Co., Ltd., available under the trade name U-4HA, was used as a binder component (1).

A polyfunctional urethane acrylate produced by Shin-Nakamura Chemical Co., Ltd., available under the trade name U-15HA, was used as a binder component (2).

A product of Nippon Kayaku Co., Ltd., available under the trade name KAYARAD PET30 (molecular weight: 300, number of photocurable groups: 3) was used as a binder component (3).

A pentaerythritol triacrylate produced by Nippon Kayaku Co., Ltd. was used as a binder component (4).

A product of KYOEISHA CHEMICAL Co., LTD., available under the trade name LINC-3A (fluoromonomer) was used as a binder component (5).

Methyl acetate was used as a solvent (1).
Cyclohexanone was used as a solvent (2).
Propylene glycol monomethyl ether was used as a solvent (3).
Methyl isobutyl ketone was used as a solvent (4).

IRGACURE 184 (trade name) (chemical name: 1-hydroxy-cyclohexyl-phenyl-ketone) produced by BASF A.G. was used as a photopolymerization initiator (1).

IRGACURE 819 (trade name) (chemical name: bis(2,4,6-trimethylbenzoyl)-phenylphosphine oxide) produced by BASF A.G. was used as a photopolymerization initiator (2).

IRGACURE 379 (trade name) (chemical name: 2-dimethylamino-2-(4-methyl-benzyl)-1-(4-morpholin-4-yl-phenyl)-butan-1-one) produced by BASF A.G. was used as a photopolymerization initiator (3).

IRGACURE 127 (trade name) (chemical name: 2-hydroxy-1-{4-[4-(2-hydroxy-2-methyl-propionyl)-benzyl] phenyl}-2-methyl-propan-1-one) produced by BASF A.G. was used as a photopolymerization initiator (4).

X-71-1203M (reactive anti-fouling agent) produced by Shin-Etsu Chemical Co., Ltd. was used as an anti-fouling agent.

A TAC substrate produced by FUJIFILM Corporation, available under the trade name TF80UL (thickness: 80 μm, refractive index: 1.47), was used as a light-transmitting substrate (1).

An acrylic substrate produced by the following method was used as a light-transmitting substrate (2).

Pellets mainly formed from a copolymer (glass transition point: 130° C.) of methyl methacrylate and methyl acrylate were melt-kneaded, and a polymer was extruded from openings of a die by a method of melt-extruding a polymer while removing foreign matters from the polymer using a filter. Subsequently, the polymer was stretched to 1.2 times the original size in the extrusion direction (lengthwise direction) while cooled. The stretched polymer was then stretched to 1.5 times the stretched size in a direction perpendicular to the lengthwise direction, whereby a 40-μm-thick acrylic substrate (refractive index: 1.49) was produced.

A COP substrate produced by ZEON Corporation, available under the trade name ZF16 (thickness: 100 μm, refractive index: 1.53), was used as a light-transmitting substrate (3). To achieve the adhesion between the light-transmitting substrate (3) and the optical functional layer (1), a cycloolefin resin primer (refractive index: 1.53 (after curing)) was applied to a dry film thickness of 500 nm using a slot die coater, whereby a dropping-process primer layer was formed.

The abbreviations of the compounds are as listed below.
PGME: Propylene glycol monomethyl ether
DPHA: Dipentaerythritol pentaacrylate
MIBK: Methyl isobutyl ketone
PETA: Pentaerythritol triacrylate
TAC: Triacetyl cellulose
(Preparation of Composition)

The compositions were prepared by mixing the following components.
(Optical Functional Layer (1))

| (First optical functional layer (1) composition 1) | |
| --- | --- |
| Binder component (1): U-4HA | 75 parts by mass |
| Binder component (2): U-15HA | 20 parts by mass |
| Solvent (1): Methyl acetate | 55 parts by mass |
| Solvent (2): Cyclohexanone | 45 parts by mass |
| Solvent (3): PGME | 10 parts by mass |
| Photopolymerization initiator (1): IRGACURE 184 | 2 parts by mass |

| (First optical functional layer (1) composition 2) | |
| --- | --- |
| Binder component (1): U-4HA | 75 parts by mass |
| Binder component (2): U-15HA | 20 parts by mass |
| Solvent (1): Methyl acetate | 55 parts by mass |
| Solvent (2): Cyclohexanone | 45 parts by mass |
| Solvent (3): PGME | 10 parts by mass |
| Photopolymerization initiator (2): IRGACURE 819 | 2 parts by mass |

| (Second optical functional layer (1) composition 1) | |
| --- | --- |
| Refractive-index adjustment particles: DP-1153 | 75 parts by mass |
| Binder component (2): U-15HA | 25 parts by mass |
| Solvent (3): PGME | 16 parts by mass |
| Photopolymerization initiator (2): IRGACURE 819 | 2 parts by mass |

| (Second optical functional layer (1) composition 2) | |
| --- | --- |
| Refractive-index adjustment particles: DP-1153 | 75 parts by mass |
| Binder component (2): U-15HA | 25 parts by mass |
| Solvent (3): PGME | 16 parts by mass |
| Photopolymerization initiator (1): IRGACURE 184 | 2 parts by mass |

| (Second optical functional layer (1) composition 3) | |
| --- | --- |
| Refractive-index adjustment particles: DP-1153 | 75 parts by mass |
| Binder component (2): U-15HA | 25 parts by mass |
| Solvent (3): PGME | 16 parts by mass |
| Photopolymerization initiator (3): IRGACURE 379 | 2 parts by mass |

| (Optical functional layer (2) composition) | |
| --- | --- |
| High-refractive-index particle sol | 12 parts by mass |
| Binder component (3) | 12 parts by mass |
| Solvent (3): PGME | 75 parts by mass |

| (Low-refractive-index layer composition) | |
| --- | --- |
| Hollow silica particles (average primary particle size: 50 nm, void ratio: 40%) | 15.0 parts by mass |
| Binder component (4): PETA | 1.0 part by mass |
| Binder component (5): LINC-3A | 1.0 part by mass |
| Solvent (5): MIBK | 83.0 parts by mass |
| Photopolymerization initiator (3): IRGACURE 127 | 0.1 parts by mass |

Example 1

The first optical functional layer (1) composition 1 and the second optical functional layer (1) composition 1 were simultaneously applied in layers using a 2-slot die coater at an application rate of 20 m/min, so that the first optical functional layer (1) composition 1 was located on the substrate side (bottom side) compared to the second optical functional layer (1) composition 1. Thereby, a laminated coating film was formed.

Subsequently, using an ultraviolet LED device (product of Noritsu Koki Co., Ltd., peak wavelength: 365 nm), the formed laminated coating film was pre-cured with ultraviolet in an irradiation amount of 480 mJ/cm$^2$, so that a pre-cured laminated coating film was formed.

The pre-cured laminated coating film was dried at a drying temperature of 70° C. for 30 seconds to remove the solvent.

The dried laminated coating film was irradiated with ultraviolet from an ultraviolet irradiation device (product of Fusion UV Systems) in an irradiation amount of 80 mJ/cm$^2$ to cure the film into an optical functional layer (1) having a dry film thickness of 12 µm. Thereby, an optical layered body having the optical functional layer (1) on the TAC substrate was produced.

Example 2

The first optical functional layer (1) composition 1 and the second optical functional layer (1) composition 1 were simultaneously applied in layers using a 2-slot die coater at an application rate of 20 m/min, so that the first optical functional layer (1) composition 1 was located on the substrate side (bottom side) compared to the second optical functional layer (1) composition 1. Thereby, a laminated coating film was formed.

Subsequently, using an ultraviolet LED device (product of Noritsu Koki Co., Ltd., peak wavelength: 365 nm), the formed laminated coating film was pre-cured with ultraviolet in an irradiation amount of 480 mJ/cm$^2$, so that a pre-cured laminated coating film was formed.

The pre-cured laminated coating film was dried at a drying temperature of 70° C. for 30 seconds to remove the solvent.

The dried laminated coating film was irradiated with ultraviolet light from an ultraviolet irradiation device (product of Fusion UV Systems) in an irradiation amount of 80 mJ/cm$^2$ to cure the film into an optical functional layer (1) having a dry film thickness of 12 µm.

The optical functional layer (2) composition was applied to the formed optical functional layer (1) using a slot die to form a coating film. The coating film was dried and irradiated with ultraviolet light in the same manner as in the case of the optical functional layer (1), so that an optical functional layer (2) with a dry film thickness of 150 nm was formed.

The low-refractive-index layer composition was applied to the formed optical functional layer (2) using a slot die to form a coating film. The coating film was dried and irradiated with ultraviolet light in the same manner as in the case of the optical functional layer (1), so that a low-refractive-index layer with a dry film thickness of 100 nm was formed. As a result, an optical layered body having the optical functional layer (1), the optical functional layer (2), and the low-refractive-index layer on the TAC substrate was produced.

Example 3

An optical layered body was produced in the same manner as in Example 2, except that the light-transmitting substrate (2) (acrylic substrate) was used as a light-transmitting substrate, and the solvent for the first and second optical functional layer (1) compositions 1 was changed to MIBK alone.

Example 4

An optical layered body was produced in the same manner as in Example 2, except that the light-transmitting substrate (3) (COP substrate) was used as a light-transmitting substrate.

Example 5

An optical layered body was produced in the same manner as in Example 2, except that the second optical functional layer (1) composition 3 was used instead of the second optical functional layer (1) composition 1.

Example 6

An optical layered body was produced in the same manner as in Example 2, except that the irradiation amount from the ultraviolet LED in pre-curing was changed to 240 mJ/cm$^2$.

Example 7

An optical layered body was produced in the same manner as in Example 2, except that the irradiation amount from the ultraviolet LED in pre-curing was changed to 200 mJ/cm$^2$.

Comparative Example 1

An optical layered body was produced in the same manner as in Example 2, except that no pre-curing was performed.

Comparative Example 2

An optical layered body was produced in the same manner as in Example 2, except that the second optical functional layer (1) composition 2 was used instead of the second optical functional layer (1) composition 1.

Comparative Example 3

An optical layered body was produced in the same manner as in Example 2, except that the ultraviolet LED device for pre-curing was changed to an ultraviolet irradiation device.

Comparative Example 4

An optical layered body was produced in the same manner as in Example 2, except that the pre-curing was performed after the laminated coating film was dried and the solvent was removed.

Reference Example 1

An optical layered body was produced in the same manner as in Example 2, except that the first optical functional layer (1) composition 2 was used instead of the first optical functional layer (1) composition 1.

(Evaluation)

The optical layered bodies obtained in the examples, comparative examples, and reference example were evaluated for the reflectance, occurrence of unusual reflectance curve, occurrence of whitening of the optical layered body, occurrence of interference fringes, and area ratio of the refractive-index adjustment particles as described below. The evaluation results are shown in Table 1. For Example 1, occurrence of whitening of the optical layered body, occurrence of interference fringes, and the area ratio of the refractive-index adjustment particles were evaluated.

(Reflectance)

To the surface of the light-transmitting substrate on a side without the low-refractive-index layer in the optical layered body obtained in each of the examples, comparative examples, and reference example, black tape was attached for prevention of back-side reflection of the optical layered body. The minimum reflectance (%) of the optical layered body was measured from the low-refractive-index layer side using a spectral reflectance measuring apparatus (trade name: UV-3100) produced by Shimadzu Corporation in a wavelength range of 380 to 780 nm, and evaluated based on the following criteria.

Good: The desired low reflectance (a minimum reflectance of 0.3 to 0.5%) was achieved.

Acceptable: A low reflectance (a minimum reflectance of higher than 0.5% but 0.6% at most) was achieved, but the desired value (a minimum reflectance of 0.3 to 0.5%) was not achieved.

Poor: A low reflectance (a minimum reflectance of 0.6% at most) was not achieved.

(Occurrence of Unusual Reflectance Curve)

To the surface of the light-transmitting substrate on a side without the low-refractive-index layer in the optical layered body obtained in each of the examples, comparative examples, and reference example, black tape was attached for prevention of back-side reflection of the optical layered body. The minimum reflectance (%) of the optical layered body was measured from the low-refractive-index layer side using a spectral reflectance measuring apparatus (trade name: UV-3100) produced by Shimadzu Corporation in a wavelength range of 380 to 780 nm. The reflectance curve was thereby determined, and evaluated based on the following criteria.

Good: The reflectance curve is not in a ripple form.

Poor: The reflectance curve is in a ripple form.

(Occurrence of Whitening)

Under a three-wavelength lamp, the optical layered bodies obtained in the examples, comparative examples, and reference example were visually observed in terms of the transmission and reflection of the light to determine the film color of the optical layered body. The evaluation was performed based on the following criteria.

Good: No whitening of the Optical layered body occurred upon transmission and reflection.

Poor: Whitening was observed upon transmission and/or reflection.

(Occurrence of Interference Fringe)

To the surface of the light-transmitting substrate on a side without the low-refractive-index layer in the optical layered body obtained in each of the examples, comparative examples, and reference example, black tape was attached. The optical layered body was visually observed using an interference fringe inspection lamp (Na lamp) produced by Funatech Co., Ltd., so that the occurrence of interference fringes was evaluated based on the following criteria.

Good: Almost no interference fringe was observed.

Poor: Interference fringes were observed clearly.

(Area Ratio of Refractive-Index Adjustment Particles)

The area ratio of the refractive-index adjustment particles in the cross-section of the optical functional layer (1) in each of the optical layered bodies obtained in the examples, comparative examples, and reference example in the thickness direction can be determined through measurement by binarizing a cross-sectional photograph (showing the amount of particles as an area) taken by a TEM using image analysis software Win Roof (Mitani Corporation, Visual System Division).

Specifically, the optical layered body is embedded in a resin, and cross-sectional photographs (film thickness: 50 to 80 nm) of the optical functional layer (1) in the thickness direction are taken at three points of the bottom, middle, and top from the light-transmitting substrate side, by a TEM at a magnification of 5000×.

In the obtained top cross-sectional photograph, a region within 2 μm from the interface on the side opposite to the light-transmitting substrate side is taken as a region (3). The region (3) includes a range (length: 0.33 μm, width: 3.60 μm (about 1.2 μm$^2$) where the refractive-index adjustment particles are concentrated and thus the concentration is the highest. The image of this region is binarized (the amount of particles is shown as an area) using image analysis software Win Roof (Mitani Corporation, Visual System Division). In the obtained bottom cross-sectional photograph, a region within 2 μm from the interface on the light-transmitting substrate side is taken as a region (1). The image of a range (length: 0.33 μm, width: 3.60 μm (about 1.2 μm$^2$) in this region (1) is binarized (the amount of particles was shown as an area) using image analysis software Win Roof (Mitani Corporation, Visual System Division). In the obtained cross-sectional photograph of the middle part, there is a region (2) between the above region (1) and the region (3). The image of the center part of the cross-section of the optical functional layer (1) which is the region (2) (length: 0.33 μm, width: 3.60 μm (about 1.2 μm$^2$)) is binarized (the amount of particles was shown as an area) using image analysis software Win Roof (Mitani Corporation, Visual System Division).

Figure 2:
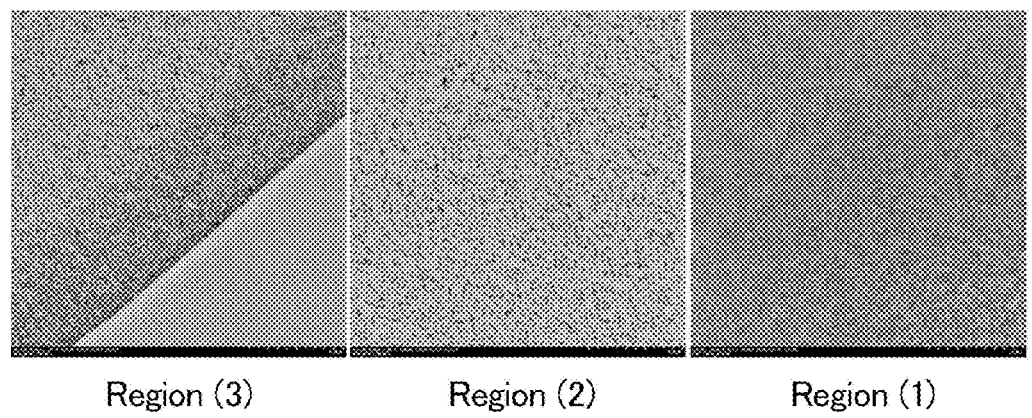
FIG. 2 is a cross-sectional TEM photograph of the optical functional layer (1) of the optical layered body according to Example 1 in the thickness direction.
Figure 3:
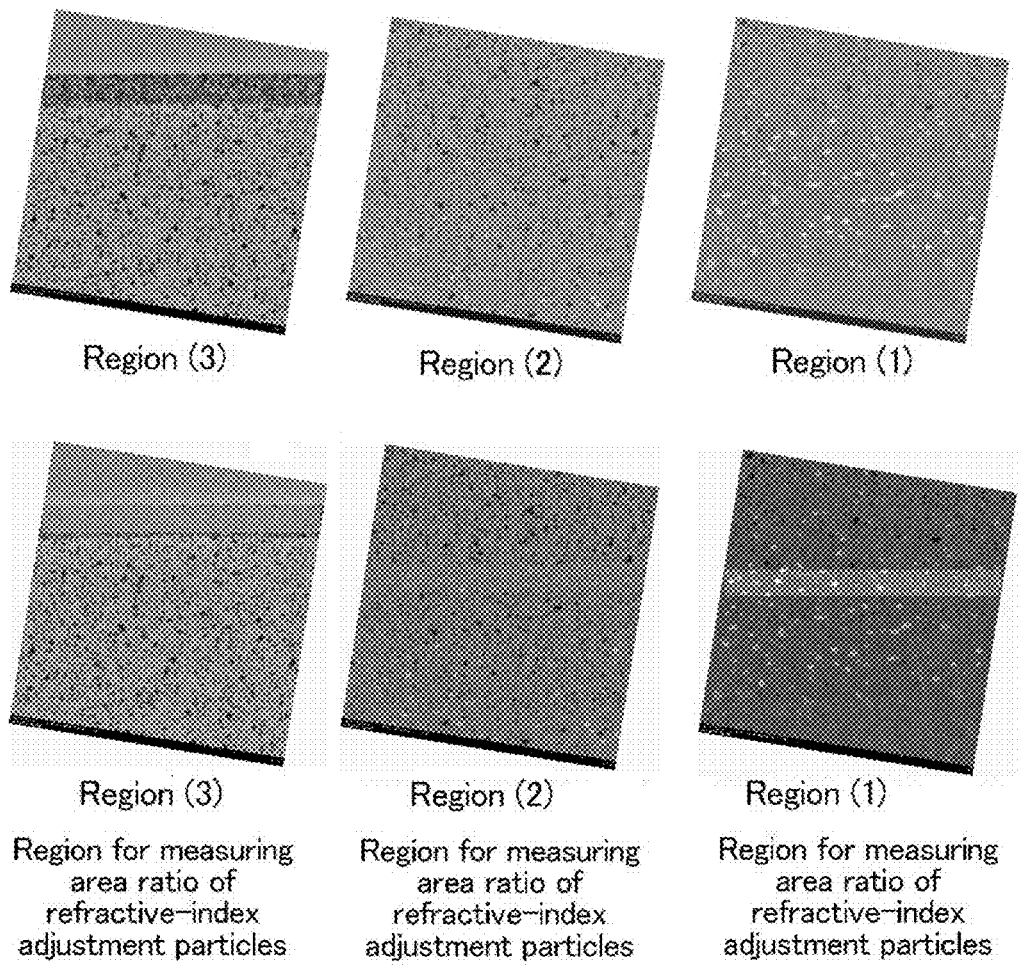
FIG. 3 is a photograph showing a method for measuring an area ratio of the refractive-index adjustment particles in the optical functional layer (1) of the optical layered body according to Reference Example 1.

FIG. 2 is a cross-sectional TEM photograph of the optical functional layer (1) of the optical layered body according to Example 1 in the thickness direction. FIG. 3 is a photograph showing the method for measuring the area ratio of the refractive-index adjustment particles in the optical functional layer (1) of the optical layered body according to Reference 1. In FIG. 3, the upper row shows the cross-sectional TEM photographs of the respective regions, and the lower row shows the photographs of the binarized images.

TABLE 1

| | Light-transmitting substrate | Initiator for optical functional layer | | Irradiation amount by ultra-violet LED for pre-curing (mJ/cm$^2$) | Reflectance | Unusual reflectance curve | Whit-ening | Inter-ference fringe | Area ratio (%) | | |
|---|---|---|---|---|---|---|---|---|---|---|---|
| | | First | Second | | | | | | Region (1) | Region (2) | Region (3) |
| Example 1 | TAC | IRGACURE184 | IRGACURE 819 | 480 | — | — | Good | Good | 1> | 16 | 63 |
| Example 2 | TAC | IRGACURE184 | IRGACURE 819 | 480 | Good | Good | Good | Good | 1> | 16 | 63 |
| Example 3 | Acrylic | IRGACURE184 | IRGACURE 819 | 480 | Good | Good | Good | Good | 1> | 20 | 57 |
| Example 4 | COP | IRGACURE184 | IRGACURE 819 | 480 | Good | Good | Good | Good | 1> | 15 | 59 |
| Example 5 | TAC | IRGACURE184 | IRGACURE 379 | 480 | Good | Good | Good | Good | 1 | 10 | 70 |
| Example 6 | TAC | IRGACURE184 | IRGACURE 819 | 240 | Good to Acceptable | Good | Good | Good | 1> | 25 | 46 |
| Example 7 | TAC | IRGACURE184 | IRGACURE 819 | 200 | Acceptable | Good | Good | Good | 1> | 27 | 41 |
| Comparative Example 1 | TAC | IRGACURE184 | IRGACURE 819 | No pre-curing. Ultraviolet irradiation device was used after drying. | Poor | Good | Good | Poor | 20 | 21 | 26 |
| Comparative Example 2 | TAC | IRGACURE184 | IRGACURE 184 | 480 | Poor | Good | Good | Poor | 19 | 22 | 24 |
| Comparative Example 3 | TAC | IRGACURE184 | IRGACURE 819 | 200 (by ultraviolet irradiation device) | Good | Poor | Poor | Poor | 1> | 7 | 86 |
| Comparative Example 4 | TAC | IRGACURE184 | IRGACURE 819 | 480 (by LED-UB irradidation after drying) | Poor | Good | Good | Poor | 23 | 25 | 27 |
| Reference Example 1 | TAC | IRGACURE 819 | IRGACURE 819 | 480 | Good | Poor | Poor | Poor | 3 | 12 | 63 |

As shown in Table 1, the optical layered body according to any of the examples showed excellent results in all the evaluations. Although the photopolymerization initiators used in the second optical functional layer (1) compositions in Example 1 and Example 4 are different, the optical layered body of Example 1 had better transparency than the optical layered body of Example 4. In terms of high, transparency, IRGACURE 819 was preferred for use as the photopolymerization initiator for the second optical functional layer (1) composition.

Also, the results of Example 5 show that reduction in the irradiation amount from the ultraviolet LED causes the refractive-index adjustment particles to be dispersed throughout the coating film formed from the first optical functional layer (1) composition to decrease the refractive index of the resulting optical functional layer (1), thereby leading to the higher reflectance of the optical layered body than the reflectance of the optical layered body of Example 1.

The results of Example 6 show that further reduction in the irradiation amount from the ultraviolet LED from the irradiation amount in Example 5 causes the refractive-index adjustment particles to be further dispersed throughout the coating film formed from the first optical functional layer (1) composition to further decrease the refractive index of the resulting optical functional layer (1), thereby leading to the even higher reflectance of the optical layered body than the reflectance of the optical layered body of Example 5.

The optical layered body according to Comparative Example 1 formed without pre-curing had the refractive-index adjustment particles dispersed to increase the reflectance of the low-refractive-index layer formed, and had a high refractive index of the optical functional layer (1) near the light-transmitting substrate, leading to a difference in the refractive index between the light-transmitting substrate and the optical functional layer (1) to cause interference fringes. In the optical layered body of Comparative Example 2, use of a photopolymerization initiator hardly being cured by ultraviolet LED in the second optical functional layer (1) composition caused the refractive-index adjustment particles to be dispersed throughout the coating film of the first optical functional layer (1) composition. As a result, the reflectance of the optical layered body increased, and the refractive index of the optical functional layer (1) near the light-transmitting substrate increased, which led to a difference in the refractive index between the light-transmitting substrate and the optical functional layer (1) to cause interference fringes.

In the optical layered body of Comparative Example 3, use of an ultraviolet irradiation device instead of an ultraviolet LED in pre-curing allowed both of the coating films formed from the respective first and second optical functional layer (1) compositions to cure, which caused localization of the refractive-index adjustment particles at the top of the resulting optical functional layer (1). As a result, refractive index differences occurred inside the optical functional layer (1) to give interference fringes, and also an unusual reflectance curve occurred. Also, curing of the coating film of the first optical functional layer (1) composition in pre-curing produced air bubbles attributed to the residual solvent in the coating film, and also caused whitening.

In the optical layered body according to Comparative Example 4, the refractive-index adjustment particles were dispersed in the coating film formed from the first optical functional layer (1) composition during the drying of the solvent. As a result, the resulting optical layered body had an increased reflectance, and an increased refractive index of the optical functional layer (1) near the light-transmitting substrate. The refractive index difference between the light-transmitting substrate and the optical functional layer (1) caused interference fringes.

In the optical layered body according to Reference Example 1, irradiation using an ultraviolet LED in pre-curing allowed both of the coating films of the respective first and second optical functional layer (1) compositions to cure, which caused localization of the refractive-index adjustment particles at the top of the resulting optical functional layer (1). As a result, refractive index differences occurred inside the optical functional layer (1) to give interference fringes, and also an unusual reflectance curve occurred. Also, curing of the coating film formed from the first optical functional layer (1) composition in pre-curing produced air bubbles attributed to the residual solvent in the coating film and also caused whitening. FIG. 2 is a cross-sectional TEM photograph of the optical layered body according to Reference Example 1, in which white parts in the region 1 are the bubbles.

INDUSTRIAL APPLICABILITY

The optical layered body of the present invention can be particularly suitable for, for example, cathode ray tube (CRT) displays, liquid crystal displays (LCD), plasma displays (PDP), electroluminescence displays (ELD), field emission displays (FED), touch panels, electronic paper, and tablet PCs.

The invention claimed is:

1. An optical layered body comprising at least an optical functional layer (1) on one surface of a light-transmitting substrate,
   wherein the refractive index of the optical functional layer (1) in the thickness direction continuously increases from the surface on the light-transmitting substrate side to the surface opposite to the light-transmitting substrate side to show a sigmoid curve.

2. The optical layered body according to claim 1,
   wherein the optical functional layer (1) and an optical functional layer (2) having a refractive index higher than the optical functional layer (1) are laminated in the stated order on one surface of the light-transmitting substrate.

3. The optical layered body according to claim 1,
   wherein an inflection point of the sigmoid curve indicates a change in the refractive index on the side opposite to the light-transmitting substrate side in the thickness direction of the optical functional layer (1).

4. The optical layered body according to claim 1,
   wherein the optical functional layer (1) contains refractive-index adjustment particles unevenly distributed on the optical functional layer (2) side, and
   when, in a cross-section of the optical functional layer (1) in the thickness direction, a region within 2 μm from the interface on the light-transmitting substrate side is a region (1), a region within 2 μm from the interface on the side opposite to the light-transmitting substrate side is a region (3), and a region between the region (1) and the region (3) is a region (2),
   an area ratio of the refractive-index adjustment particles in the region (1) is 0 to 8%,
   an area ratio of the refractive-index adjustment particles in the region (2) is 9 to 40%, and
   an area ratio of the refractive-index adjustment particles in the region (3) is 41 to 80%.

5. The optical layered body according to claim 4,
   wherein the refractive-index adjustment particles have an average particle size of 1 to 100 nm.

6. The optical layered body according to claim 2, further comprising
   a low-refractive-index layer on the optical functional layer (2).

7. A method for producing an optical layered body including at least an optical functional layer (1) on one surface of a light-transmitting substrate,
   the method comprising the steps of:
   forming a laminated coating film by simultaneously applying a first optical functional layer (1) composition and a second optical functional layer (1) composition for forming the optical functional layer (1) to one surface of the light-transmitting substrate such that the first optical functional layer (1) composition is on the light-transmitting substrate side;
   pre-curing the laminated coating film using a light-emitting diode;
   drying the pre-cured laminated coating film; and
   forming the optical functional layer (1) by fully curing the dried laminated coating film,
   wherein the first optical functional layer (1) composition and the second optical functional layer (1) composition contain respective photopolymerization initiators having absorption in different wavelength regions.

8. The method for producing an optical layered body according to claim 7, further comprising the step of
forming an optical functional layer (2) having a refractive index higher than the optical functional layer (1) after the step of forming the optical functional layer (1).

9. The method for producing an optical layered body according to claim 7,
wherein the second optical functional layer (1) composition contains an ultraviolet-curable resin, refractive-index adjustment particles, a photopolymerization initiator with an absorption coefficient of more than 100 ml/g·cm at a wavelength of at least 360 nm, and a solvent, and
the first optical functional layer (1) composition contains an ultraviolet-curable resin, a photopolymerization initiator with an absorption coefficient of 100 ml/g·cm at most at a wavelength of at least 360 nm, and the same solvent as the solvent in the first optical functional layer (1) composition.

10. The method for producing an optical layered body according to claim 7,
wherein after the step of forming a laminated coating film, the step of pre-curing the laminated coating film is performed before the refractive-index adjustment particles in the coating film of the second optical functional layer (1) composition are dispersed in the entire coating film of the first optical functional layer (1) composition.

11. The method for producing an optical layered body according to claim 7,
wherein in the step of pre-curing the laminated coating film, the laminated coating film is irradiated with ultraviolet light to a cumulative amount of light of at least 400 mJ/cm$^2$ using the light-emitting diode.

12. A polarizer comprising
a polarizing element, and
the optical layered body according to claim 1, on a surface of the polarizing element.

13. An image display device comprising
the optical layered body according to claim 1, or a polarizer comprising
a polarizing element, and
the optical layered body according to claim 1, on a surface of the polarizing element.

* * * * *